US012668026B2

(12) United States Patent
Dorini

(10) Patent No.: US 12,668,026 B2
(45) Date of Patent: *Jun. 30, 2026

(54) METHOD OF OPERATION FOR AN APPARATUS FOR LAYER-BY-LAYER MANUFACTURE OF 3D OBJECTS

(71) Applicant: Stratasys Powder Production Ltd., London (GB)

(72) Inventor: Gianluca Dorini, London (GB)

(73) Assignee: Stratasys Powder Production Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,994

(22) Filed: Sep. 13, 2022

(65) Prior Publication Data

US 2023/0082932 A1     Mar. 16, 2023

(30) Foreign Application Priority Data

Sep. 13, 2021     (GB) ...................................... 2113004

(51) Int. Cl.
B29C 64/00         (2017.01)
B29C 64/153        (2017.01)
(Continued)

(52) U.S. Cl.
CPC .......... B29C 64/393 (2017.08); B29C 64/153 (2017.08); B33Y 10/00 (2014.12);
(Continued)

(58) Field of Classification Search
CPC ...................................................... B29C 64/00
See application file for complete search history.

(56) References Cited

U.S. PATENT DOCUMENTS

2016/0368055 A1* 12/2016 Swaminathan ......... B22F 12/63
2018/0186074 A1* 7/2018 Hull ........................ B22F 12/41
(Continued)

FOREIGN PATENT DOCUMENTS

WO     2017/019088 A1     2/2017
WO     2019/125407 A1     6/2019
(Continued)

*Primary Examiner* — Susan D Leong
(74) *Attorney, Agent, or Firm* — Honigman LLP; Eric J. Sosenko; Jonathan P. O'Brien

(57)     ABSTRACT

A method of manufacturing 3D objects with an apparatus having first and second heat sources and a thermal sensor. The method includes carrying out a build process after a thermal calibration process for a thermal control component (s). The calibration and build processes include a layer cycle including (i) providing a layer of particulate material defining a build bed surface; (ia) heating the surface; (ii) depositing absorption modifier over a layer-specific region and/or a surrounding area; (iii) heating the layer-specific region with the first heat source; and (iv) measuring a temperature of the surface after at least one of (i) to (iii). The layer cycle includes heating the surface of each layer with the second heat source and repeating until the calibration/build processes are complete. The outcome of each calibration routine being based on the measured temperature and being applied to the thermal control component for the subsequent layer cycle.

18 Claims, 8 Drawing Sheets

(51) Int. Cl.

| | |
|---|---|
| *B29C 64/393* | (2017.01) |
| *B33Y 10/00* | (2015.01) |
| *B33Y 30/00* | (2015.01) |
| *B33Y 40/00* | (2020.01) |
| *B33Y 40/10* | (2020.01) |
| *B33Y 50/00* | (2015.01) |
| *B33Y 50/02* | (2015.01) |
| *G01J 5/10* | (2006.01) |

(52) U.S. Cl.
CPC ............... *B33Y 40/10* (2020.01); *B33Y 50/02* (2014.12); *G01J 5/10* (2013.01); *G01J 2005/106* (2013.01)

(56) References Cited

U.S. PATENT DOCUMENTS

| | | | | |
|---|---|---|---|---|
| 2019/0143407 A1* | 5/2019 | Imoto | .................... | B33Y 30/00 419/54 |
| 2020/0398482 A1* | 12/2020 | Tjellesen | .............. | B29C 64/209 |
| 2021/0362429 A1* | 11/2021 | Barnes | .................. | B33Y 10/00 |
| 2022/0048113 A1* | 2/2022 | Rosenblatt | ........... | B29C 64/393 |
| 2022/0227059 A1* | 7/2022 | Borras Camarasa | .. | B33Y 50/02 |

FOREIGN PATENT DOCUMENTS

| | | | |
|---|---|---|---|
| WO | 2019/245515 A1 | 12/2019 |
| WO | 2020/027820 A1 | 2/2020 |
| WO | 2020/222828 A1 | 11/2020 |
| WO | 2021/080609 A1 | 4/2021 |
| WO | 2021/154282 A1 | 8/2021 |
| WO | 2021/214465 A1 | 10/2021 |

\* cited by examiner

Carriage Position 1
S301

Operate first carriage
S302

Operate second carriage
S303

Carriage position 2
Build platform lowered
S304

Return carriages to
Position 1
S305

30_2    12    30_1    34

FIRST DIRECTION (L-R)

SECOND DIRECTION (R-L)

METHOD OF OPERATION FOR AN APPARATUS FOR LAYER-BY-LAYER MANUFACTURE OF 3D OBJECTS

FIELD OF THE INVENTION

The present disclosure relates to a method of operation for an apparatus for the manufacture of three-dimensional (3D) objects using a thermal sensor to control the thermal cycle of the process. The method might find particular benefit in a powder bed fusion apparatus in which 3D objects are built layer-by-layer from particulate material. A controller and an apparatus for applying the method are also disclosed.

BACKGROUND

In applications for forming 3D objects from particulate material, such as powder bed fusion applications like "print and sinter" and laser sintering, an object is formed layer-by-layer from particulate material spread in successive layers across a support. Each successive layer of the object is melted or partially melted to fuse or sinter the particulate material over defined regions and in so doing to consolidate it, in order to form a cross section of the 3D object. In the context of particulate polymer materials, for example, the process of melting achieves fusion of particles. Typically, several heating devices are operated in a print and sinter apparatus to heat the particulate material during each layer cycle. For example, one or more infrared bar heaters may be moved across each layer to heat the layer surface (the build bed surface) sufficiently to achieve fusion over selectively modified regions. The thermal processes of the layer cycle require accurate control to achieve high-quality, uniform objects with well-defined properties in a reliable, reproducible manner. Typically, a thermal sensor is also present, such as a pyrometer or thermal camera, that detects the temperature of the surface. The thermal camera may be used as part of feedback control in the operation of the one or more heating devices. In addition, the thermal camera may be used to calibrate itself against for example thermal events defined by the characteristics of the particulate material, such as the onset of melting. In addition, the various heating devices may also be calibrated. Despite efforts to develop thermal calibration processes for these components, such known processes do not provide the desired reliability and reproducibility. This is exacerbated when control across a fleet of printers, which may be located in different environments, is necessary, for example, for process transfer and support. Therefore, improvements to the thermal calibration processes are needed.

SUMMARY

The following disclosure describes a method of operation for an apparatus for the layer-by-layer manufacture of 3D objects from particulate material, the apparatus comprising a first heat source, a further heat source and a thermal sensor and configured to measure the temperature of the layer; the method comprising:

carrying out a thermal calibration process comprising one or more calibration routines for a thermal control component of the layer, and subsequently carrying out a build process to manufacture a 3D object; wherein the calibration process and the build process each comprise a layer cycle comprising the steps of:

(i) distributing a layer of particulate material over a build area, the layer providing a build bed surface of the build area;

(ia) heating the build bed surface;

(ii) depositing absorption modifier over at least one of a layer-specific region within the build bed surface and a surrounding area surrounding the layer-specific region;

(iii) heating the layer-specific region by passing, while operating, the first heat source across the build bed surface; and (iv) measuring a temperature of the build bed surface using the thermal sensor at least once after one or more of steps (i) to (iii);

wherein the layer cycle of steps (i) to (iv) comprises heating the build bed surface of each layer by operating a further heat source;

wherein the layer cycle of steps (i) to (iv) is repeated a number of times until the calibration process and the build process are complete;

wherein an outcome of each thermal calibration routine is based on the measured temperature in step (iv) and is applied to the thermal control component for the subsequent layer cycle; and wherein, for the build process, the step (ia) of heating preheats the layer to a preheat temperature between the solidification temperature and the melting temperature of the particulate material, and the step (iii) of heating causes the particulate material within the layer-specific region to melt.

BRIEF DESCRIPTION OF THE DRAWINGS

Reference is now directed to the drawings, in which.

In the drawings, like elements are indicated by like reference numerals throughout.

DETAILED DESCRIPTION

Figure 1A:
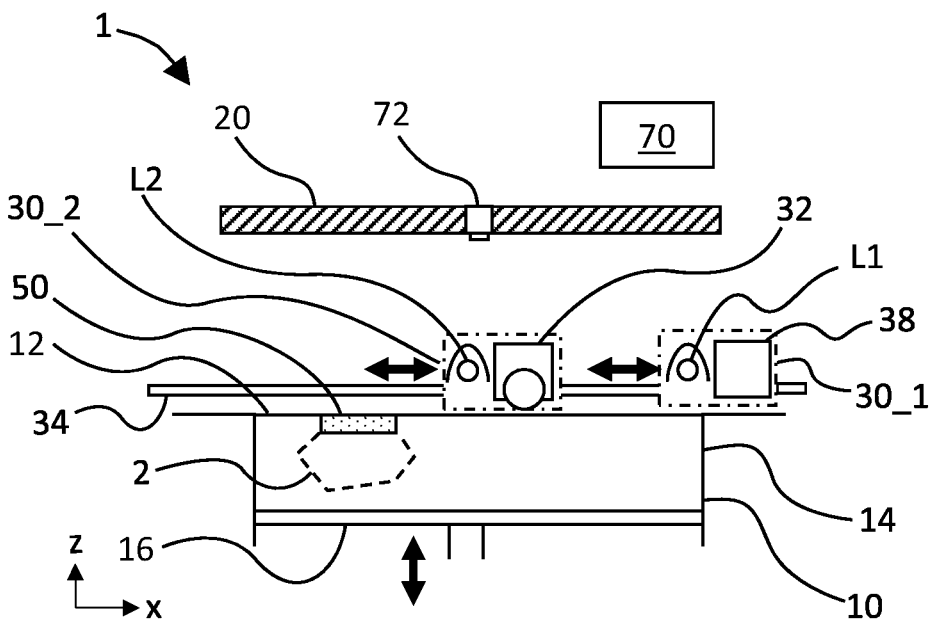
FIG. 1A is a schematic cross-section of a side view of an apparatus configured to apply the method of the invention.

FIG. 1A schematically illustrates a detail of a cross section of a powder bed fusion type apparatus 1, as an example of a 3D printing apparatus configured to carry out the method and its variants that will now be described with reference to FIGS. 1A to 10.

In a typical process for the layer-by-layer formation of a 3D object from particulate material, successive layers of particulate material are distributed, each to form a build bed surface 12 which is processed to form successive cross-sections of an object 2. In this context, the reference to the 'build bed surface' is to the surface of the top-most layer of particulate material. In other words, each newly distributed layer forms a new build bed surface 12 that is the build bed surface of the layer to be processed in that particular layer cycle.

Figure 1B:
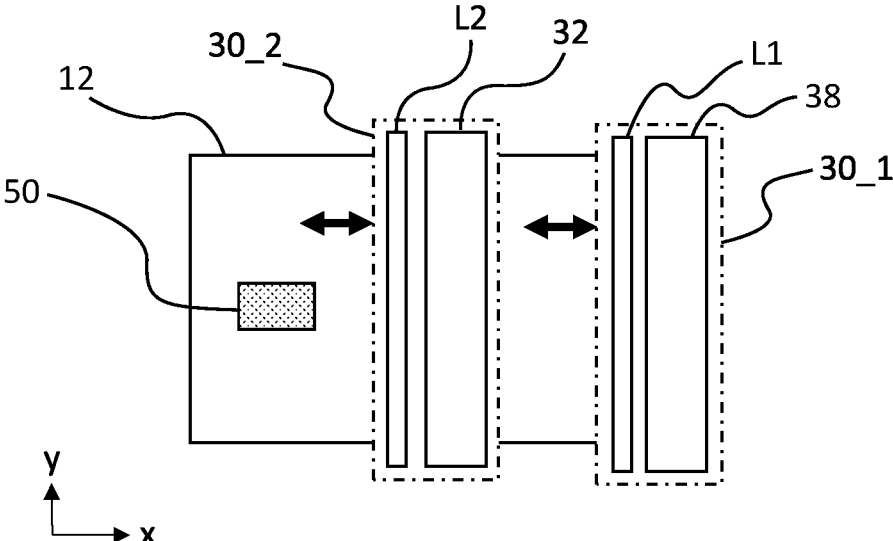
FIG. 1B is a schematic plan view of the build bed surface of FIG. 1A.

As indicated in FIG. 1A, the apparatus 1 comprises a distribution module 32 for distributing each layer of particulate material across a build bed 14, a deposition module 38 for selectively depositing absorption modifier over a layer-specific region 50 defined within the build bed surface 12, and a first heating module comprising a first heat source L1 to heat the layer-specific region 50 following deposition of the absorption modifier. The layer-specific region 50 may represent a cross section of an object 2, or a test region in a calibration process. These modules may be provided on one or more carriages moveable across the layer. In the example of FIG. 1A, an implementation with two carriages 30_1 and 30_2 is shown. The carriages are arranged on one or more rails 34 that allow them to be passed back and forth above the build bed surface 12 along a first direction along x and along a second direction opposite the first direction. The first carriage 30_1 in this variant comprises the deposition module 38, such as a droplet deposition module configured to deposit the absorption modifier in the form of fluid droplets. Mounted behind the deposition module 38, with respect to the first direction, is the first heat source L1. The second carriage 30_2 comprises the distribution module 32, for example comprising a roller as shown. Where the distribution module is a roller, a fresh portion of powder is supplied to the surface to the right of the roller and to the left of the build bed surface 12, and the portion is spread over the build bed as the roller is moved over the build bed surface 12. Alternatively, the distribution module may contain particulate material that it gradually releases and spreads over the build bed surface 12 as it moves along the first direction. The build bed 14 is contained between walls 10 and supported on a platform 16, which is arranged to move vertically within the container walls 10 to lower or raise the build bed surface 12; for example, by a piston located beneath the platform 16. The apparatus further comprises, without specifically showing, a reservoir to supply particulate material to a dosing module that doses an amount of fresh particulate material to be distributed across the build bed 14, thus forming a new build bed surface 12. FIG. 1B shows a plan view of the build bed surface 12 of FIG. 1A with the layer-specific region 50 and the carriages 30_1 and 30_2 with the distribution, deposition and heating modules spanning the width of the build bed surface 12 (along y). As indicated before, each carriage 30_1, 30_2 is moveable back and forth along the x-axis, which herein is also referred to as the length of the build bed surface 12, the length being perpendicular to the width, however reference to length and width is not intended to indicate relative extent of the two directions but to merely help reference directions of the process.

The absorption modifier may be radiation absorber deposited over the layer-specific region 50. Selectivity of preferentially heating the layer-specific region 50 versus the surrounding area is achieved by providing a heat source L1 with a spectrum of radiation that is absorbed to a higher degree by the radiation absorber compared to the surrounding area. If the combination of absorber and power input to the heat source L1 (causing a certain energy input to the region 50) is sufficient, the particulate material of region 50 melts, or sinters, to fuse or consolidate and form a region of consolidated particulate material. Thus, during a build process of an object, the radiation absorber may be deposited over layer-specific regions 50 of the build bed surface 12 so as to define the cross sections of the object 2 over successive layers. The term "layer-specific region" indicates that its position, shape and pattern will be layer dependent within a specific process or routine, and might vary between different processes and routines.

In a typical build process, the build bed surface 12 is maintained at or close to a predefined target layer temperature that is below the melting temperature of the particulate material and above the solidification temperature. This means it may for example be maintained within a temperature range of 10-20° C. below the melting temperature. The fresh particulate material is generally at a significantly lower temperature, such that the distributed layer has a significant cooling effect on the build bed surface 12 of the previous layer. Such large temperature differentials can cause warping of the fused parts, and it is desirable to increase the temperature of the distributed layer to, or closer to, the target layer temperature of the build bed surface 12 without unnecessary delay. Therefore, a preheat source, such as a second heat source L2, as indicated in the apparatus 1 of FIGS. 1A and 1B, may be provided behind the distribution module 32 on the second carriage 30_2 to immediately preheat the freshly distributed particulate material. The wavelength spectrum of the second heat source L2 is such that, over a preheat period of time, it is capable of sufficiently preheating the layer-specific region 50 and the surrounding area, both being void of radiation absorber, up to or towards the target layer temperature. The target layer temperature may be achieved in combination with, for example, operating a stationary overhead heater 20 provided above the build bed surface 12 as shown in FIG. 1. As for the heat source L1, the period of preheat time may be determined by the speed at which the preheat source L2 traverses the layer-specific region 50 and transfers heat to the particulate matter of the layer-specific region 50. To adequately control the temperature of the build bed surface 12 during the layer cycle, the build bed surface 12 may generally be monitored by a thermal sensor 72 provided above the build bed surface 12. The thermal sensor 72 may be centrally mounted in the form of a thermal camera or a pyrometer within the area of the overhead heater 20, or it may be provided on one or both of the carriages in the form of a thermal line scan sensor. The measurements from the thermal sensor 72 may be used to apply feedback control to the one or more heating devices, for example to the overhead heater 20, to achieve thermal uniformity on the build bed surface 12. If adequately controlled, local differences in temperature can be avoided, which improves object quality, for example mechanical and visual properties, across the build bed surface 12.

In order to adequately control thermal components that are operated during the layer cycle to control the temperature of each layer, it is desirable to carry out a calibration process of one or more calibration routines before a build process is carried out. For example, for the overhead heater 20 to be adequately feedback controlled, it is desirable that the thermal sensor 72 is calibrated with respect to a thermal characteristic of the particulate material, such as the melting point of the particulate material. In such a process the layer-specific region 50 for each layer is processed according to a layer cycle specific to a calibration routine for the thermal sensor 72. Similarly, it may be desirable to calibrate the one or more heat sources such as the first and/or second heat source L1, L2 before starting an object build process. However, it has been found that known calibration routines for such thermal components do not provide adequate calibration outcomes that ensure the required mechanical and aesthetic qualities of an object.

Figure 2:
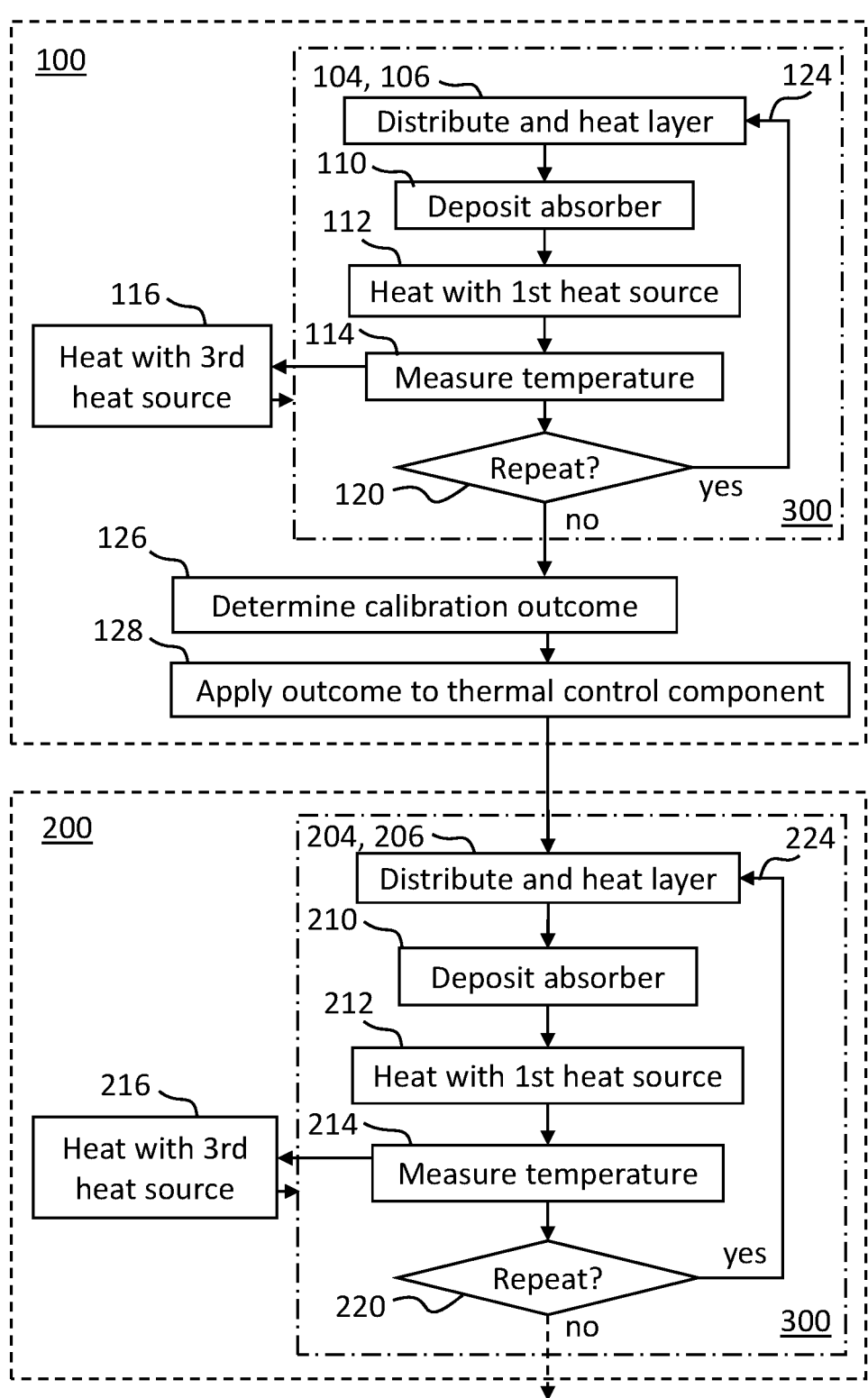
FIG. 2 is a flow chart of the method of the invention.

The inventor has discovered that an improved method of operation for an apparatus for the layer-by-layer manufacture of a 3D object from particulate material may be provided, the apparatus comprising a first heat source L1 moveable across a build bed surface 12 of the layer and a thermal sensor 72 configured to measure the temperature of the build bed surface 12. The method and its variants will now be described first with reference to the flow diagram of FIG. 2 and for illustrative purposes with respect to use of a radiation absorber as absorption modifier. However, equivalent effects may be achieved by use of absorption inhibitor instead of, or in combination with, radiation absorber. The use of absorption inhibitor on its own or in combination with radiation absorber is well known in the art. FIG. 2 illustrates the method of carrying out a thermal calibration process 100 comprising a calibration routine for a thermal control component of the layer, and subsequently carrying out a build process 200 to manufacture a 3D object 2, wherein the calibration process 100 and the build process 200 each comprise a layer cycle 300 comprising the steps of: (i) distributing a layer of particulate material over a build area, indicated at block 104 for the calibration process and at block 204 for the build process, the layer providing a build bed surface 12 of the build area; (ia) optionally, heating the build bed surface 12 at block 106 of the calibration process and block 206 of the build process, for example using the stationary heat source 20 or the second heat source L2; (ii) depositing absorption modifier over at least one of a layer-specific region 50 within the build bed surface 12 and a surrounding area surrounding the layer-specific region 50 indicated at block 110 for the calibration process and at block 210 for the build process; (iii) heating the layer-specific region 50 over a period of time by moving/passing the first heat source L1 over the build bed surface 12 while operating it, indicated at block 112 for the calibration process and at block 212 for the build process; and (iv) measuring the temperature of the build bed surface 12 (herein also synonymous with "layer") using the thermal sensor 72 at least once during or after one or more of steps (i) to (iii), indicated at block 114 for the calibration process and at block 214 for the build process. The layer cycle of steps (i) to (iv) is repeated a number of times until the respective calibration process and the build process are complete, along loop 124 via decision point 120 for the calibration process, and along loop 224 via decision point 220 for the build process. The total number of layers for the calibration process may be different to that of the build process. The layer cycle further comprises heating the build bed surface 12 by operating a further heat source (herein also referred to as third heat source), such as stationary overhead heater 20 fixedly positioned above the build bed surface 12. The third heat source 20 may be operated in response to the measured temperature at step (iv) and with respect to a target layer temperature T3 (target) that is between the melting point of the particulate material and above the solidification temperature of the particulate material, or it may be pre-calibrated and operated at a predefined input power. This is indicated at block 116 for the calibration process and at block 216 for the build process.

The calibration outcome of the thermal calibration routine determined at block 126 is based on the measured temperatures at block 114 and is applied to the thermal control component for a subsequent layer cycle at block 128 of the calibration process 100.

Furthermore, during the layer cycle 300 of the build process 200, and for certain layers of the calibration routine, the first heat source L1 in step (iii) is operated to cause the layer-specific region 50 to reach the melting temperature of the particulate material and cause it to melt. In the case of the build process, the melted layer-specific region contributes thus to a cross section of the object 2 for that layer. In the case of the calibration process, a test part, or a cross section of a test part, may result.

The step of heating the layer at blocks 106 and 206 following distribution may be carried out by the third heat source 20. In a variant of the method, the second, moveable, heat source may be operated to heat the layer following distribution. This is described with reference to FIG. 8.

Figure 8:
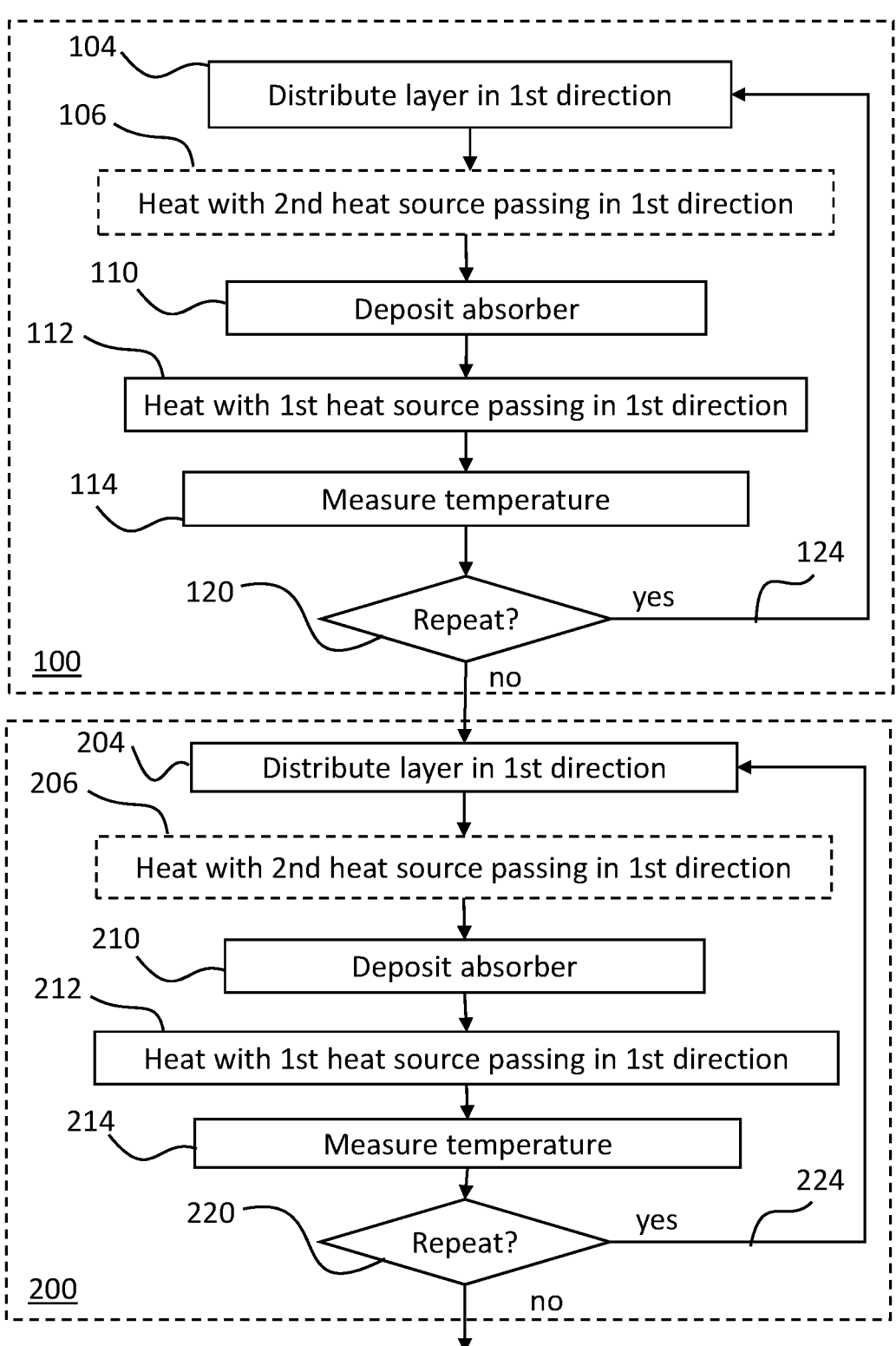
FIG. 8 is a variant of the flow chart of FIG. 2.

FIG. 8 is a variant of FIG. 2 and illustrates a preferred variant in which certain thermal process steps are carried out in the same direction (here first direction) and in which a second heat source, such as L2 of FIG. 1 mounted behind the distribution device, may be used to heat the freshly distributed layer at block 106 of the calibration process 100 and at block 206 of the build process 200. FIG. 8 will now be described with respect to a variant of the method in which the thermal control component of the apparatus is a thermal sensor 72, however in other variants the calibration routine may instead, or in addition, be a calibration routine for at least the first heat source L1, and optionally further for the second heat source L2 and/or third heat source 20. In FIG. 8, the layer cycle 300 is not specifically indicated but equally applies. As in FIG. 2, the calibration routine of the calibration process 100 starts with the distribution of a fresh layer at block 104 to form the build bed surface 12. The direction of distribution of the fresh layer in this variant is along a first direction, for example along x from left to right as indicated in FIG. 1.

At block 106, as indicated by the dashed outline, the build bed surface 12 is optionally preheated by the second heat source L2. Any suitable heat source may be provided to preheat each newly distributed layer. Where a moveable heat source L2 is used, the step of heating may comprise passing the moveable heat source L2 across the layer, preferably also along the first direction while operating the heat source L2 to heat the layer-specific region 50. Alternatively, the third heat source 20, e.g. overhead heater 20, may be arranged to provide the heating function of block 106 either alone, or in combination with the moveable heat source L2.

At block 110, radiation absorber is deposited over the layer specific region 50, which is then heated at block 112 with the first heat source L1 by moving the first heat source L1 along the first direction while operating it to heat the layer-specific region 50. Depending on the calibration routine, the particulate material of the layer-specific region 50 may be heated to melt or sinter, or it may be heated to a temperature below the onset of melting or sintering. For example, in a typical calibration routine for the thermal sensor 72, the layer-specific region 50 may be progressively heated over a number of layers, the layer-specific region 50 of each further layer reaching a higher temperature than that of the preceding layer until the particulate material of the layer-specific region 50 starts to melt or sinter. Thus, not all layer-specific regions 50 may melt, or fully melt, during the calibration routine. To ensure that melting occurs during the calibration routine, the layer-specific region may be monitored with an optical sensor. Alternatively, a fixed number of layers of the subset of layers may be predetermined and tracked at decision point 120_3 over which melting is known to occur. Achieving a progressively higher temperature of the first layer-specific region 50 may be achieved by the method comprising, at step (b2) of block 110, depositing a further amount of absorption modifier over the first layer-specific region 50, wherein the further amount of absorption modifier causes the particulate material of the layer-specific region 50 to absorb more energy at block 112 of heating with the first heat source than the layer-specific region 50 of the preceding layer. Melting may be known to occur, from previous tests, at a certain number, or between certain numbers, of droplets deposited per unit area over the layer-specific region 50, where such number provides sufficient radiation absorber absorbing sufficient energy from the radiation of the first heat source L1 to melt the particulate material.

At block 114, which may apply after any one or more blocks of the layer cycle 300, the temperature profile of the build bed surface 12 is measured at least once during or after one or more of blocks 104 to 112 using the thermal sensor 72. For example, the step of measuring may be carried out e.g. after a fixed time delay after one or more of the steps of distributing and heating with the first and/or second heat source L1, L2. Irrespective of whether the calibration routine is for the thermal sensor 72 itself or for one or more of the heat sources, the thermal sensor 72 is used to measure the temperature of the build bed surface 12 at least once during one or more of blocks 104 to 112, for example following at least one of the steps of the layer cycle, such as following heating with the second heat source and/or following heating with the first heat source.

At decision point 120, the layer cycle 300 of the calibration routine may be repeated for a number of times along repeat loop 124 to process further layers until the calibration routine is complete, after which it moves on to a further calibration routine, or on to the build process 200. The layer cycle 300 of the calibration routine thus comprises blocks 104 to 114.

Further calibration routines will be described below with reference to FIG. 5. The layer cycle 300 of the object build process 200 comprises the same steps as the layer cycle 300 of the calibration routine of the calibration process 100, and is carried out after applying the calibration outcome of the calibration process. Not specifically indicated in FIG. 8 but applying equally as in FIG. 2, the layer cycle 300 of the calibration routine is followed by the step of determining the calibration outcome. In this example, the calibration outcome of the calibration routine for the thermal sensor in calibration process 100 may be a set point for the temperature scale of the thermal sensor with respect to the melting point of the particulate material. The calibration outcome is then applied to the thermal sensor and the temperature measurements taken subsequently, such as during the build process 200, at block 214, are calibrated temperature measurements by applying the set point. As illustrated in FIG. 8, the layer cycle of the build process 200 begins at block 204 of distributing a fresh layer of material, and optionally comprises, where comprised in the calibration process 100, heating the fresh layer at block 206. During the build process, the step of heating at block 206 (here by the second heat source L2) is applied to preheat the distributed layer to a temperature at or closely below the target layer temperature, T3 (target). During the calibration process 100 at block 106, for example when applied to calibrate the one or more heat sources, heating may be applied to achieve a different temperature of the layer, for example the second heat source L2 may be used at a different duty cycle or power that may be lower or higher than that applied during the build process 200.

Where a moveable second heat source L2 is used, the step at block 206 is carried out preferably while moving the second heat source L2 in the first direction over the build bed surface 12, in the same direction as during the calibration process 100.

Next at block 210, radiation absorber is deposited over the layer-specific region 50, and at block 212 the layer-specific region 50 is heated by passing the first heat source L1 in the first direction over the build bed surface 12 so as to melt or sinter the layer-specific region 50 to form a cross section of the object.

At block 214, which may apply after any one or more blocks of the build process layer cycle, the temperature profile of the build bed surface 12 is measured at least once using the thermal sensor 72, for example following at least heating with the second heat source L2 and/or following heating with the first heat source L1.

At decision point 220, the process continues for the total number of layers along repeat loop 224 until the object is complete, after which the build process ends. After the build process 200, a cooling process may be applied (not specifically indicated or described) for controlled cooling of the build volume before it is removed from the apparatus.

The layer cycle 300 of the build process 200 is described by the sequence of blocks 204 to 214. The layer cycle 300 is thus similar, or substantially identical, to that of the calibration process 100. It may for example only vary from certain calibration routines in the pattern and shape of the deposited absorption modifier, which may vary layer-by-layer, and/or in the duty cycles applied for the first and/or second heat sources for some or all of the layers of a specific calibration routine for the first and/or second heat source for example.

FIG. 8 further illustrates by way of respective blocks 112 and 212 and identical respective blocks 104 and 204 how, for both the calibration process 100 and the build process 200, the steps of distributing each layer and the step of heating the layer-specific region are both carried out in the same, first, direction. Preferably, for both the thermal calibration process and the build process, the layer cycle step (i) of distributing each layer and (iii) of passing the first heat source L1 over each layer is carried out in a first direction. This provides additional thermal uniformity and consistency. Furthermore, the step of heating with the second heat source L2 is preferably also carried out in the first, same direction for each of the plurality of layers of the calibration process 100 and the build process 200. In this way, each location of the build bed surface 12 experiences the same thermal cycle, with the same timings, as any other location of the build bed surface 12. This may provide for improvements in thermal consistency and uniformity of the build bed surface 12, leading to improved accuracy and reliability of the built parts.

During both the calibration process 100 and the build process 200, the thermal sensor 72 is operated intermittently or continuously to measure the temperature of at least certain areas of the build bed surface 12. The areas may represent the entire build bed surface 12, or they may represent portions of the build bed surface 12. The thermal sensor 72 may, for example, be used to measure the temperature of the build bed surface 12 following the layer cycle steps of blocks 106, 206 of heating with the second heat source L2 and/or following layer cycle steps of blocks 112, 212 of heating with the first heat source L1. During the calibration process 100, the measurements may be used to analyse the temperature of the layer-specific region 50, while during the build process 200, the measurements may be used to analyse the temperature of, or temperature profile over, zones of the build bed surface 12 not comprising the layer-specific regions 50. During a calibration routine the thermal control component may be the thermal sensor 72, and from the temperature of the layer-specific regions 50 a set point may be determined for the thermal sensor scale. For example, during at least one of the layers of the calibration routine for the thermal sensor 72, the first heat source L1 may be operated at a fusing power input so as to cause the particulate material of the layer-specific region 50 to melt or sinter. From the layer-by-layer evolution of the measured temperatures of the layer-specific region 50 following block 112 of heating with the first heat source L1, and optionally from the layer-by-layer evolution of the measured temperatures of the layer-specific region 50 following block 106 of heating with the second heat source L2, a set point for the temperature scale of the thermal sensor 72 may be determined based on a characteristic of the particulate material, such as the latent heat of fusion. The outcome of the calibration routine in this case is a set point for the temperature measurements of the thermal sensor, and is used in a subsequent routine or process. During the subsequent build process 200, the calibrated temperature measurements for example of the area surrounding the layer-specific region 50 may be used to maintain the build bed surface 12, or at least the surrounding area surrounding the layer-specific region 50, at a uniform target layer temperature T3 (target). The step of heating the layer at block 106 and block 206 may be carried out by operating the second heat source L2 or the stationary heat source 20 between the respective steps of distributing the layer and depositing radiation absorber. Preferably, the second heat source L2 is used as a moveable heat source L2, that is moved over the build bed surface 12 in the first direction whilst being operated. The calibration routine for the thermal sensor 72 may be carried out before each build process 200. Different materials may have different melting points; similarly, the same material treated or aged differently may display a shift in melting point. Furthermore, in "print and sinter" processes, typically the unfused particulate material is recycled and reused. The material properties may change as a result of thermal cycling, potentially causing a shift in the melting conditions and necessitating an adjustment in the set point. For a fleet of apparatus 1, some of which may be located in different environments, the calibration process disclosed herein may significantly improve the alignment or normalisation in performance between such apparatus and assist in service support.

Figure 3:
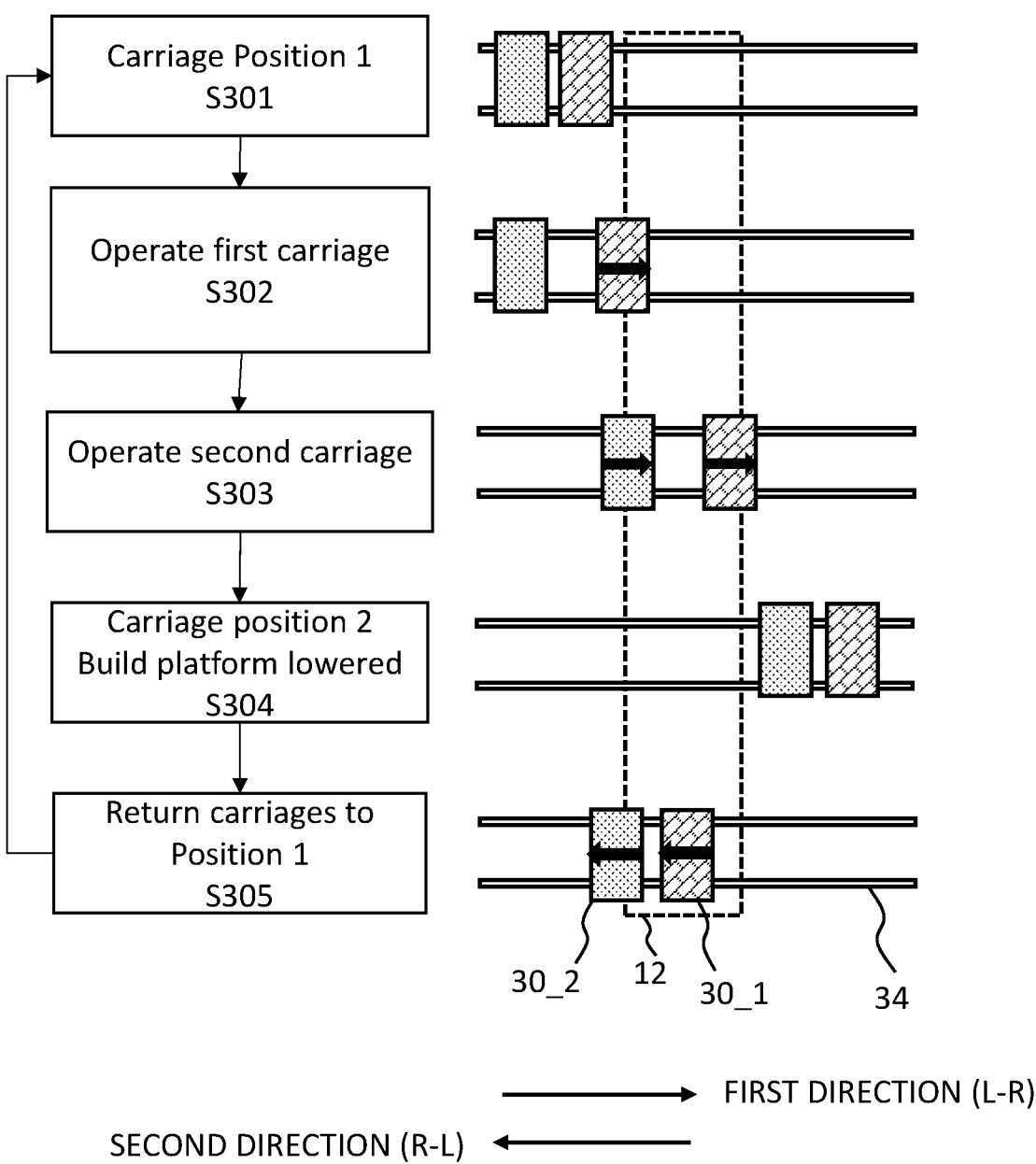
FIG. 3 illustrates an implementation of the flow chart of FIG. 2.

As indicated above, the calibration routine may be one to calibrate any one of the thermal control components controlling the temperature of the build bed surface 12 of each layer, such as a thermal sensor 72, or one or more heat sources configured to heat each layer, such as the first and/or second heat source L1, L2. FIG. 3 further illustrates the steps of the layer cycle for the calibration process and the build process of FIG. 8 using the carriage layout of FIG. 1. The first carriage 30_1 is arranged to the right of the second carriage 30_2 with respect to the first direction, here along x. The layer cycle starts with the carriages in "Carriage Position 1" at step S301 ready to carry out the steps of blocks 110, 210 of depositing absorber over the layer-specific region 50 (not shown in FIG. 3). The step of distributing the first layer and optionally preheating it is not shown in FIG. 3. In other words, the physical state of the layer at "Carriage Position 1" may be that after block 106 and 206 respectively, where the preheat source L2 is used.

At step S302, the first carriage 30_1 starts to move from left to right along the first direction to deposit radiation absorber over the layer-specific region 50. The first carriage

30_1 further comprises the first heat source L1, which is operated as the first carriage 30_1 moves along the first direction to heat the layer-specific region 50.

At step S303, the second carriage 30_2 starts to move along the first direction, following the first carriage 30_1, to distribute a fresh layer of particulate material using distribution module 32. Where the second source is a moveable heat source L2, mounted downstream of the distribution module 32 with respect to the first direction, the second heat source L2 is operated to heat the particulate material after it has been distributed.

After steps S302 and S303 of heating and distributing in the first direction, both carriages reach "Carriage Position 2" beyond the far side of (or to the right of) the build bed surface 12 with respect to the first direction. The build platform 16 may be lowered at this point by a layer thickness, and at step S305 both carriages return to the starting position to the left-hand side of the build bed surface 12, moving from right to left in the second direction, to arrive at "Carriage Position 1" ready for a next layer cycle at S301.

The layer cycle steps may be provided by different carriage layouts of one or more carriages and different order of the modules. Comparing the starting points of the layer cycle in FIGS. 2 and 3 and FIGS. 7 and 8, as will next be described, the layer cycle may start at any suitable block illustrated in the various Figures, for example FIG. 2, as determined by the starting position for a specific layout of the modules and the order of the carriages, without being substantially changed in any other way.

Figure 7:
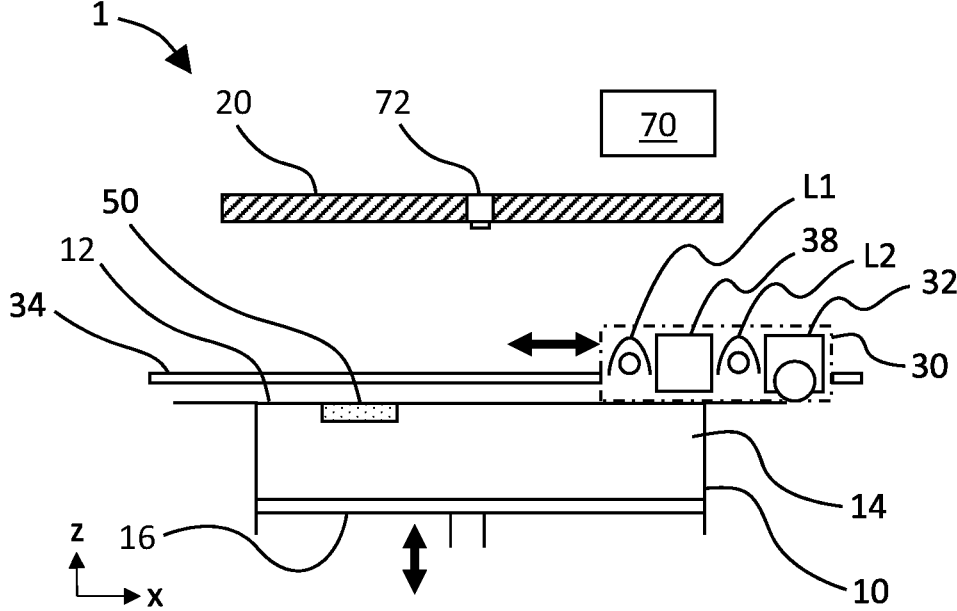
FIG. 7 is a schematic cross-section of a variant of the apparatus of FIG. 1A.

Turning now to FIG. 7, a schematic cross section of the apparatus 1 is illustrated having a variant carriage layout to that in FIG. 1A. In FIG. 7, a single carriage 30 comprises the distribution module 32, which is located at the leading edge of the carriage with respect to the first direction, followed by the second heat source L2, the deposition module 38, and the heat source L1 with respect to the first direction. With this variant, the layer cycle illustrated in FIG. 3 is adapted so that from "Carriage Position 1", the carriage is operated to carry out steps S303 comprising the blocks 104, 204 of distributing (and, preferably, 106, 206 of preheating) and S304 comprising the blocks 110, 210 of depositing radiation absorber and blocks 112, 212 of heating the layer-specific region 50 in a single pass from left to right. The pass ends at "Carriage Position 2" with a build bed surface 12 heated by the first heat source L1 before returning to "Carriage Position 1" to start the layer cycle again at block 104, 204 of distributing a fresh layer. In other words, the physical state of the layer at "Carriage Position 1" is that after block 112 and 212 respectively of FIG. 2. Thus, the layer cycle may be defined from different starting points, depending on how it conveniently fits with the carriage layout of the apparatus. The directionality of the process steps is not affected by the carriage layout.

Considerations with Respect to Timings Between Steps

It was found that, in a preferable layer cycle of the calibration process 100 and the build process 200, steps that have a significant thermal impact on the build bed surface 12 are carried out along the first direction only, and not along a second direction opposite, or perpendicular to, the first direction. Significant thermal events are considered to comprise heating (by the first heat source L1 and/or the second heat source L2) and cooling (by the fresh layer distributed by distribution module 32) of the build bed surface 12. During movement along the second direction therefore, the heat source(s) and the distribution module are not operated to heat or cool the build bed surface 12. Optionally, the step of depositing radiation absorber may also occur in the same (first) direction, for example, when moving the deposition module in the first direction, however on most processes this is not considered a significant thermal event.

It is furthermore preferable that the layer cycle of the calibration process 100 adopts similar process conditions of the layer cycle of the build process 200, so that as many as possible of the significant thermal events of the calibration process layer cycle are substantially, or at least predominantly, the same as those of the build process layer cycle.

For example, the respective power inputs during each heating and/or preheating step by the first and/or second heat source L1, L2 for each layer may be substantially the same or at least as similar as possible for the calibration process and the build process. Where the first heat source L1 and/or the second source L2 are a moving heat source, the respective speed profiles of passing the first heat source L1 and optionally the second heat source L2 may preferably be the same in the layer cycle of the build process 200 and the calibration process 100. The speed profile for distributing each layer at blocks 104, 204 of the layer cycle is preferably also the same as the speed profile of passing the first heat source L1 over the layer at blocks 112, 212 of the layer cycle. The speed profile of heating each layer by operating the second heat source L2 at blocks 106 and 206 may be the same as the speed profile of passing the first heat source L1 over the layer at blocks 112 and 212. Furthermore, the various speed profiles may preferably be constant speed profiles, i.e., the one or more carriages 30_1, 30_2 preferably move at a substantially constant, non-variable speed over the build bed surface 12. The speeds of passing the first and second heat sources L1, L2 over each layer and the speed of distributing each layer at step (i) may be equal and constant for the layer cycle of the calibration process 100 and of the build process 200. This means that over the entire method of operation, regardless of whether the process is for a calibration process 100 or for a build process 200, the period of time over which a location on the build bed surface 12 is heated by the first heat source, or by the first and second heat sources, is the same as that at any other location on the build bed surface 12. In addition, the duration of time over which the distribution module 32 moves over a location on the build bed surface is the same as that at any other location on the build bed surface 12.

Another consideration is the timing between the different steps of the layer cycle. Preferably, the time interval between initiating adjacent steps is constant from layer to layer, and is the same for both the calibration process layer cycle and the build process layer cycle. The calibration process layer cycle and the build process layer cycle may thus comprise the same of at least one, and preferably all, of the following: initiating the step of heating the layer comprising the layer-specific region 50 with the first heat source at blocks 112 and 212 after a predefined first time interval t$\Delta_1$ after initiating the step of distributing the layer at block 104 or 204, or, where applied, after initiating the step of heating the layer with the second heat source L2 at optional blocks 106, 206; and initiating the step of distributing each new layer at block 104 and 204 after a predefined second time interval $\Delta t_2$ following initiating the step at blocks 112 and 212 of heating the previous layer with the first heat source L1; initiating the optional step of heating the layer with the second heat source at block 106, 206 after a predefined third time interval $\Delta t_3$ after initiating the step (i) of distributing the layer; optionally, initiating the step of depositing absorption modifier after a predefined fourth time interval $\Delta t_4$ after initiating the step of distributing each new layer at block 104 and 204, or, where the step at block 106 and 206 of heating with the second heat source is present, after a predefined fourth time interval $\Delta t_4$ following initiating the step of heating the layer with the second heat source at blocks 106 or 206; wherein the predefined first, second, and optionally the third and fourth time interval remains the same respective constant time interval across the build bed surface 12 for each layer. It should be noted that these conditions are relevant to the thermal events on the build bed surface, and it is over the build bed surface 12 where the speed and time intervals require to be controlled. Furthermore, preferably all of first, second, third and fourth time intervals are the same time interval so that the layer cycle occurs over a constant period of time for each layer. This may be achieved by moving the first heat source L1, the distribution module 32, the second heat source L2 and optionally the deposition module 38 over the build bed surface 12 at a constant speed profile.

Figure 4:
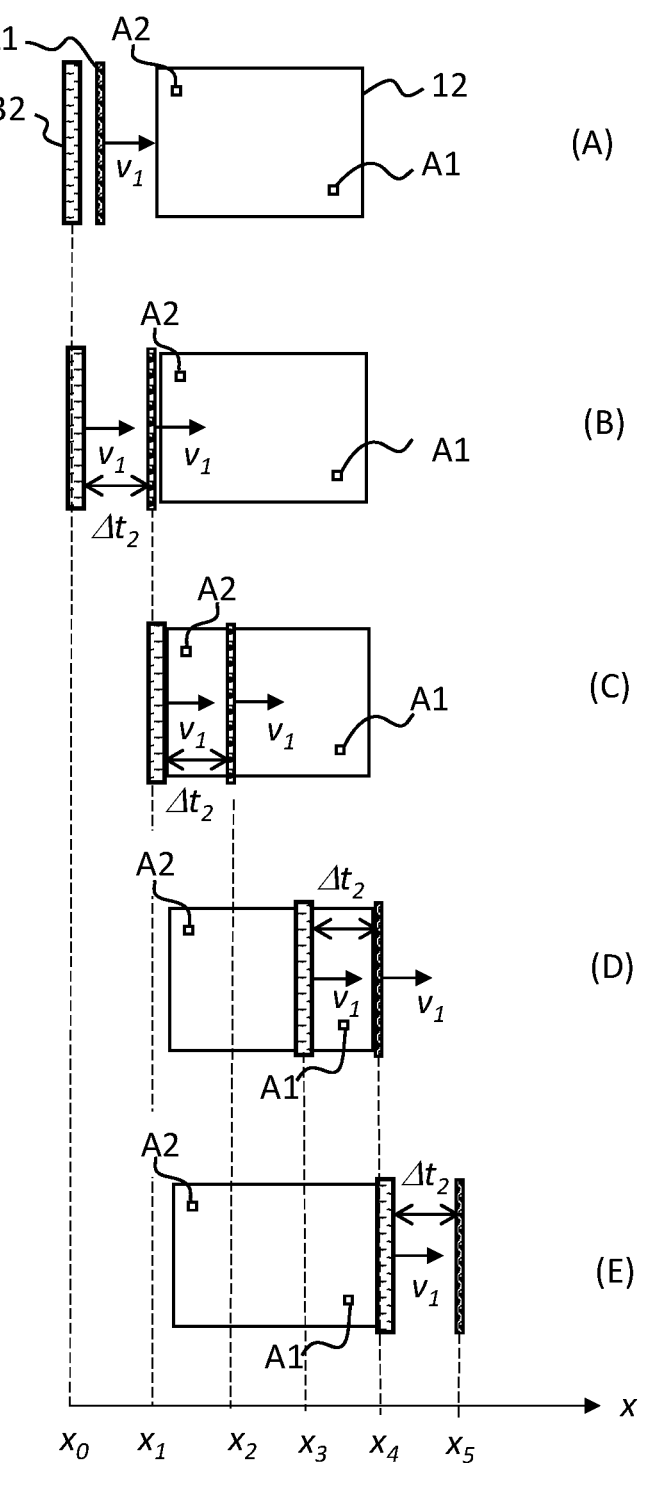
FIG. 4 illustrates time intervals between the method steps of FIG. 2.

Such a preferred layer cycle is illustrated in FIG. 4, which is a schematic illustration of a preferred variant of the layer cycle 300 using, for example, the two-carriage layout of FIG. 1A and FIG. 3. For simplicity, only the first heat source L1 and the distribution module 32 are shown to represent significant thermal events of heating (by first heat source L1) and of cooling (distribution module 32). The direction of traverse of the distribution module 32 and the first heat source L1 is along the first direction, indicated along x. Two locations A1 and A2 are indicated on the build bed surface 12, A2 towards the near end of the build bed surface 12 with respect to "Carriage Position 1" to the left of the build bed surface 12, and A1 to the far end of the build bed surface 12 with respect to the near end (and closer to "Carriage Position 2").

In FIG. 4A, the distribution module 32 is in the "Carriage Position 1" with the first heat source just in front of the distribution module 32, with respect to the first direction along x. The first heat source L1 (in analogy to FIG. 3, the first carriage 30_1) starts to traverse the build bed surface 12 at a constant speed v1=const to carry out the step of heating at block 106 of FIG. 2.

In FIG. 4B, after a time interval corresponding to the above described second time interval $\Delta t_2$, the distribution module 32 is initiated to follow the heat source L1 in the first direction (or in analogy to FIG. 3, the second carriage 30_2 starts to follow the first carriage 30_1) to carry out the step of distributing a new layer at block 104 of FIG. 2. Ahead of the distribution module 32, in analogy to FIG. 1A, the first heat source L1 has reached position x1 and moves at the same speed v1 as the distribution module 32, and the second time interval $\Delta t_2$ is determined by the speed v1 and the distance x1 between the distribution module 32 and the first heat source L1. In FIGS. 4C and 4D, the first heat source L1 and the distribution module 32 are illustrated in different positions during their traverse of the build bed surface 12. In FIG. 4C, the first heat source L1 is in position x2 and has passed location A2, and the distribution module 32 at position x1 is just reaching the near edge of the build bed surface 12. The distance between the first heat source L1 and the distribution module 32 remains the same since both move at the same speed v1, and thus the distance between them and the second time interval $\Delta t_2$ remains constant.

In FIG. 4D, the first heat source L1 is at position x4 and has now also passed location A1, and the distribution module 32, at position x3, has passed location A2.

In FIG. 4E, the first heat source L1 has reached position x5 at the end of its traverse and stops. It may be turned off once it passes the far end of the build bed surface 12. At this time in the layer cycle, the distribution module 32 has reached position x4 at the far end of the build bed surface 12 and has also passed location A1 and has distributed a fresh layer over it. Both the first heat source and the distribution module, or the first and second carriage, reach "Carriage Position 2" at step S304 of FIG. 3, not shown, after which both the distribution module 32 and the first heat source L1 return to the starting position at a return speed or respective speeds that may be faster than v1 (also not shown, but analogous to step S305 in FIG. 3). The return speed/speeds of traverse of, and the distance between, the distribution module 32 and the first heat source L1 (or in analogy the return speed/speeds of traverse of, and the distance between, the first and second carriage) to the starting position determine the first time interval $\Delta t_1$ before the layer distributed is heated by the first heat source L1. Thus, the first time interval $\Delta t_1$ may be longer than the second time interval $\Delta t_2$. The same considerations apply for the third time interval $\Delta t_3$ where a second heat source L2 is provided, for example fixed to the second carriage 30_2 behind the distribution module 32, such that the third time interval is determined by the speed of the second carriage 30_2 and the distance between the second heat source L2 and the distribution module 32. The fourth time interval $\Delta t_4$ between the steps of initiating distributing each new layer at block 104 and 204 and depositing absorption modifier at block 110, or, where the step at block 106 and 206 of heating with the second heat source L2 is present, between the steps of initiating the step of heating the layer with the second heat source at blocks 106 or 206 and depositing absorption modifier at block 110, depends, like the second time interval, on the distance between the carriages and the speed at which the carriages move.

Thus, the second time interval between the layer cycle steps of distributing each layer and heating each layer with the first heat source L1 may preferably be substantially constant. Furthermore, the time interval between the layer steps of distributing each layer and heating each layer with the second heat source L2 may be substantially constant. In addition, the time interval between the layer steps of heating each layer with the first heat source L1 and the step of distributing each further layer may be substantially constant. This means that the sequence of the respective first, second, third and fourth constant time intervals may be the same for each layer cycle, such that the duration of time of each layer cycle is constant. It has been found that this provides for an improved stable thermal cycle and for a more reliable build process 200 when these layer cycle conditions are equally applied to the calibration process 100.

In variants of the build process 200 and of the calibration routine for the thermal sensor 72, the first heat source L1 may further be operated at substantially the same, constant power input for each layer. Additionally, or instead, the step of preheating may be carried out at the same power profile along the first direction by the second heat source L2.

Calibration Routines

A calibration routine for one or more of the components of the apparatus operated to control the temperature of the build bed surface 12 and the layer-specific region 50 may be provided in such a way that it follows the layer cycle of the method and its variants described herein. The thermal control component may be one or more of the thermal sensor 72, the first heat source L1, the heat source applied to carry out the step at block 106 and 206 of heating (for example the second heat source L2); and the third heat source 20, wherein the calibration routine may be a corresponding one or more of: wherein the thermal sensor comprises an array of a plurality of individually controllable pixels, an alignment correction for the measurement position of the thermal sensor 72, a distortion correction for the pixel position of the thermal image and/or the thermal measurement scale of the thermal sensor 72 and a thermal calibration routine for measurement scale of the thermal sensor 72; a calibration routine for the input power profile of the first heat source L1 and/or for the input power profile of the second heat source L2 with respect to one another and/or with respect to the measurement scale of the thermal sensor 72; and a calibration routine for the input power profiles of the heating elements of the third heat source with respect to one another and/or with respect to the temperature measurements of the layer surface by the thermal sensor 72, using zonal control.

Figure 6:
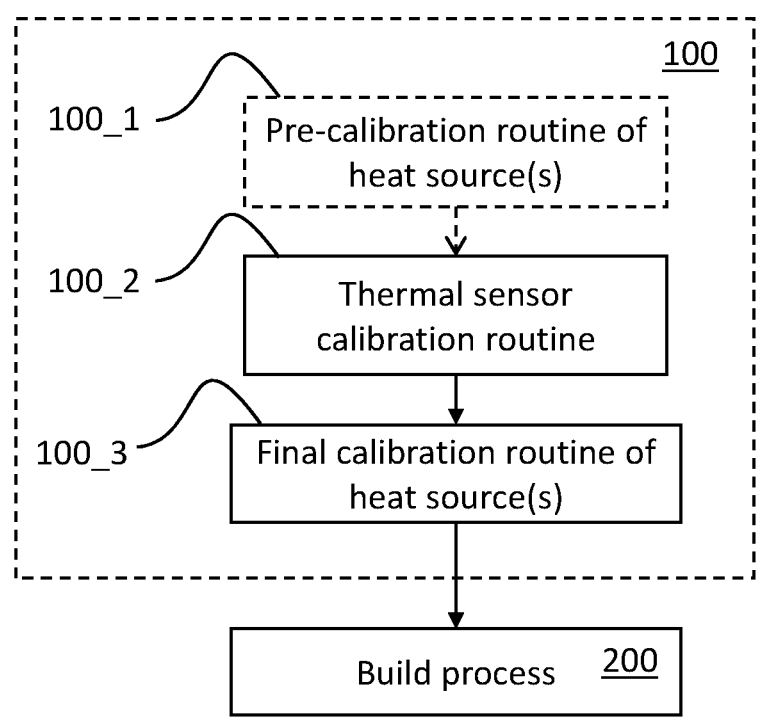
FIG. 6 is a flow chart of a build process layer sequence following the method of FIG. 2.

The calibration routines may be applied in a specific sequence. FIG. 6 is a flowchart illustrating an example calibration process 100 with up to three sequentially applied calibration routines 100_1, 100_2 and 100_3. Routine 100_1 may be an optional pre-calibration routine for at least one of the first and second heat sources L1, L2, and is indicated as optional in dashed outline in FIG. 6. An outcome of the calibration routine 100_1 may be a corrected input power profile determined for the at least one of the first and second heat sources L1, L2 based on measurements of the temperature of the layer specific region 50 using the thermal sensor 72. For example, the input power of the first heat source L1 may be adjusted so that its radiated energy is at a predetermined temperature difference with respect to that of the second heat source L2—in other words the first and second heat sources may be calibrated with respect to one another.

Following the optional calibration routine 100_1 for a pre-calibration of the heat source(s), a calibration routine 100_2 for the thermal sensor 72 is carried out, in which the pre-corrected power input(s) to at least one of the first and second heat sources L1, L2 are applied during the layer cycle. A set point as calibration outcome is determined for the temperature scale of the thermal sensor 72 with respect to a thermal characteristic of the particulate material, wherein the correction is based on the one or more measured temperature profiles during the layer cycle. Following calibration of the set point of the measurement scale of the thermal sensor 72, a further, "final", heat source calibration routine 100_3 for the first (and second, where used) heat source is carried out, wherein during the layer cycle of the final heat source calibration routine 100_3, the calibrated thermal sensor 72 is used to measure the temperature of the build bed surface 12 comprising the layer-specific region 50. During the final heat source calibration routine 100_3, a respective corrected power input profile along the first direction to at least one of the first and second heat sources L1, L2 is determined. In other words, a calibration outcome in form of a correction to the power input to the first and/or second heat sources is determined with respect to the calibrated temperature measurements by the thermal sensor 72. Following this, the illustrated method of operation proceeds to the build process 200, for which the calibration outcomes of the final heat source calibration routine (the respective corrected input power profile along the first direction to the at least one of the first and second heat sources L1, L2, wherein the temperature measurements taken by the thermal sensor 72 of the build bed surface 12 are calibrated temperature measurements), and the outcome of the calibration routine 100_2 for the thermal sensor, are applied.

Thus, the layer cycle 300 of each layer of the subsequent build process 200 comprises the steps of heating (preheating) at block 206 with the second heat source L2 operated at the corrected first input power profile determined during routine 100_3 of FIG. 6 to the input power of the second heat source L2; heating at block 212 with the first heat source L1 operated at the corrected second input power profile determined during routine 100_3 of FIG. 6; measuring the temperature of the build bed surface 12 using the calibrated thermal sensor 72 at least once during the layer cycle 300, e.g. after one or more of the steps of distributing and heating, such as after a fixed time delay after any of these steps, wherein the calibrated thermal sensor 72 is provided by applying the outcome determined during calibration routine 100_2 of FIG. 6 to the measurements of the thermal sensor 72.

Each of the calibration routines 100_1, 100_2, 100_3, for example as described above, comprises the layer cycle 300 of the build process 200, and which in addition may be such that the steps of distributing each layer, and of passing the second heat source L2 and the first heat source L1 over each layer, are carried out in the same (e.g., first) direction. The layer cycle 300 is repeated a respective number of times for each calibration routine until the respective calibration routine is complete. Preferably, the speed of passing each of the modules over the build bed surface 12 along the first direction is a constant speed that is the same for each module. Furthermore, the same considerations for the layer cycle described with reference to the variant of FIG. 4 and as applied by the carriage layouts of FIGS. 1A and 7, or suitable variants, are preferably applied to each of the calibration routines.

In more detail, examples of the various calibration routines are as follows. In an example of a calibration routine for the thermal sensor 72, the measurement scale of the thermal sensor may be calibrated with respect to the onset of melting, which represents the start of a phase change for which a change in the thermal behaviour of the particulate material may be expected. A set point for the temperature scale of the thermal sensor 72 may relate to a characteristic material property identified from, for example, a change in the rate of increase of the measured temperature of the layer-specific region 50 due to the onset of melting. To achieve melting of the layer-specific region 50, the layer cycle 300 of a calibration routine for the thermal sensor 72 may be repeated at least until the particulate material within the layer-specific region 50 starts to melt, wherein the step of depositing absorption modifier comprises depositing for each further layer a different amount of absorption modifier compared to the previous layer so as to cause the particulate material of the layer-specific region 50 to absorb more energy from the first heat source L1 than that of the preceding layer. From the layer-to-layer evolution of the temperature measurements of the layer-specific region 50 made during the layer cycle, for example, following the step of block 112 of heating with the first heat source L1 and optionally following the step of block 106 of heating with the second heat source L2, a set point for the thermal sensor 72 may be determined based on a characteristic of the material as identified from a characteristic in the evolution of the measured temperature following the step of block 112 of heating with the first heat source L1 and optionally following the step of block 106 of heating with the second heat source L2. It should be noted that it is not necessary to correct the scale of the thermal sensor 72 to an absolute temperature scale. Instead, it is sufficient to apply a set point relative to the particulate material properties to subsequent measurements of the primary thermal sensor 72, and to control subsequent layers based on the thermal sensor readings relative to this set point.

A further example calibration routine may be one for the first heat source L1 and/or the second heat source L2. In FIG. 6 this is indicated as "final calibration routine of heat source(s)" 100_3 following the calibration routine 100_2 of the thermal sensor 72. A further thermal control component may thus be the first heat source L1 and/or the second heat source L2, following which the calibrated first heat source L1 and/or the calibrated second heat source L2 are used during subsequent layers such as those processed with the build process layer cycle.

A further calibration routine may therefore be a final calibration routine 100_2 for the first and second heat sources L1, L2 with respect to the calibrated temperature scale of the thermal sensor. The layer cycle for the final calibration routine of the heat sources may further comprise: operating the first heat source L1 during the heating step at block 112 at a first input power profile, and operating the second heat source L2 during the heating step at block 106 at a second input power profile, and repeating the layer cycle at least two more times, wherein for each layer at least one of the first and second input power profiles is different to that of a preceding layer. Block 114 further comprises measuring the temperature of the layer-specific region 50 after the step of heating with the first heat source L1 at block 112 and after the step of heating with the second heat source L2 at block 106. The calibration routine for the first and/or second heat source further comprises receiving a first target temperature that the layer-specific region 50 should reach after heating with the first heat source L1 and a second target temperature that the layer-specific region 50 should reach after heating with the second heat source L2, and determining, from the measured first and second set of temperatures and based on the first target temperature and the second target temperature, a corrected first input power profile along the first direction for the first heat source L1 and/or a corrected second input power profile along the first direction for the second heat source L2, wherein the outcome of the calibration routine is the corrected first and/or second input power profile. During the layer cycle of the build process 200, the corrected first input power profile to the first heat source is applied during the step at block 212 and/or the corrected second power input profile to the second heat source L2 is applied during the step at block 206 of heating each distributed layer.

The "input power profile" indicates an input power applied along at least one dimension of the build bed surface, for example in direction of movement of the first and/or second heat source. The input power profile may be a constant input power profile, or an input power profile that varies along the direction of movement, i.e. with distance over the build bed surface 12. One of the input power profiles may for example vary along the first direction; for example, the input power profile for the second heat source may be a decreasing input power profile along the first direction.

Figure 5:
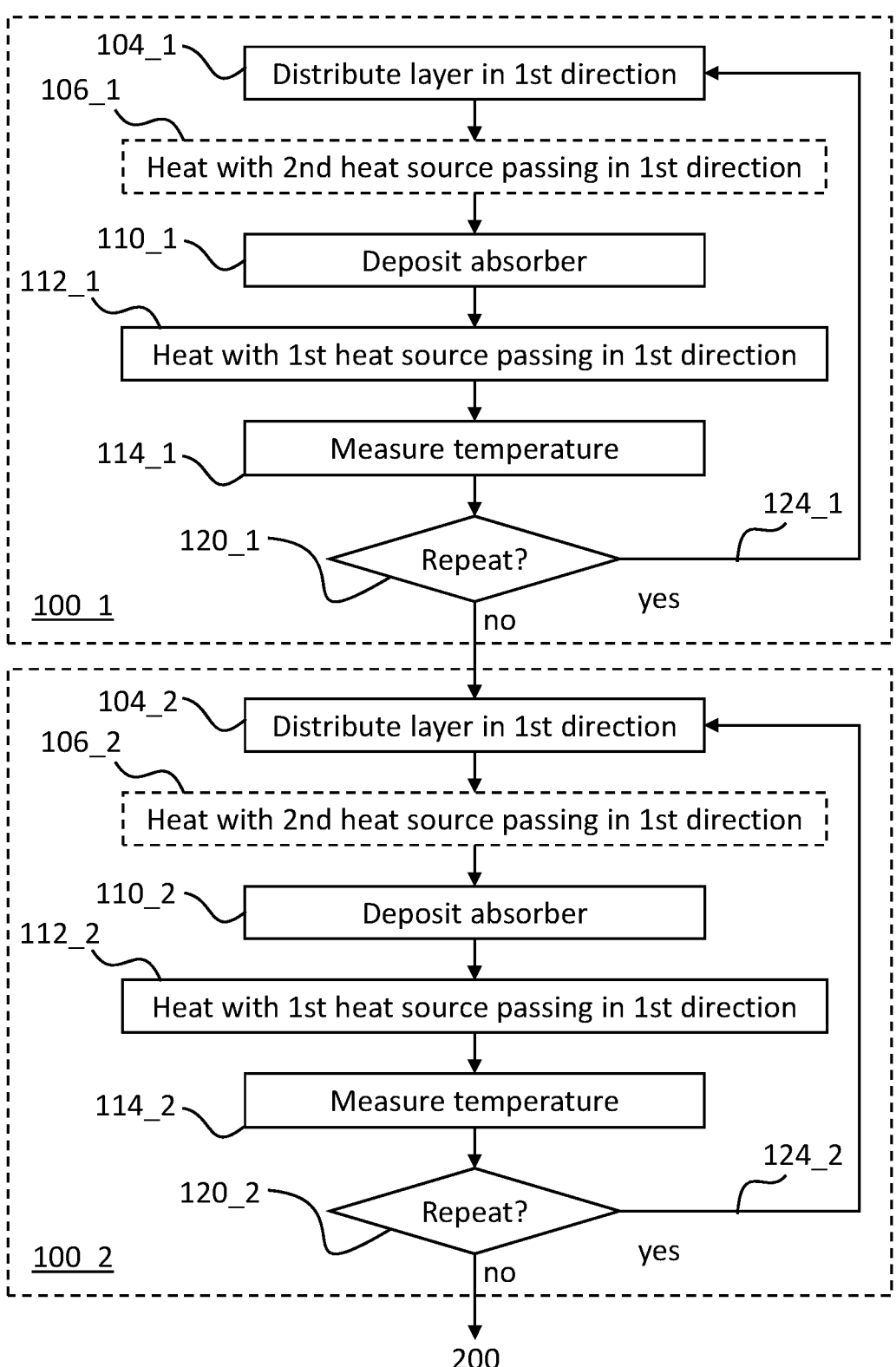
FIG. 5 is a flow chart of a build process layer cycle following the layer cycle of FIG. 2.

Turning to FIG. 5, which is a flow chart of two calibration routines 100_1 and 100_2 of a preferred variant of a calibration process 100, the layer cycle 300 (not indicated but applying equally as shown in FIG. 2 for the calibration process 100) of each routine comprises analogous layer cycle steps at blocks 104 to 114 of FIG. 2; namely the layer cycle steps at blocks 104_2 to 114_2 of the first routine 100_1 are the same as those at blocks 104_2 to 114_2 of the second routine 100_2. FIG. 5 does not specifically indicate blocks 126 and 128 of FIG. 2 but these may equally apply to each calibration routine 100_1, 100_2. The first calibration routine 100_1 may be a calibration routine for the thermal sensor 72, during which the calibration outcome in form of a set point for the measurement scale of the thermal sensor is determined and applied to subsequent measurements, and the second, subsequent calibration routine 100_2 may be to calibrate the power input to the first and/or the second heat source L1, L2, during which the calibration outcome of one or more calibrated power inputs to the first and/or second heat source is determined and applied to subsequent measurements, of e.g. the build process. The second calibration routine 100_2 may thus use the calibrated temperature measurements of the layer-specific region 50 to evaluate the heating effects of the one or more heat sources L1, L2.

As mentioned with respect to FIG. 6, in some variants of the method, a pre-calibration routine 100_1 for the first and/or second heat source L1, L2 may be carried out, for example before the calibration routine for the thermal sensor 72, so as to calibrate the performance of the heat source(s) to one another (or to itself) at the two heating steps. In the case of a pre-calibration routine 100_1 for the first heat source L1 only, for example, operated as a preheat source and a heat source during the layer cycle, the power input to the first heat source L1 may be corrected with respect to itself when operated in the two different modes. In both cases, the corrections may be made with respect to the uncalibrated thermal sensor measurements. The layer cycle of such a 'pre-calibration' routine for a single heat source, to be calibrated against different modes of operation of pre-heating and heating to fuse, may further comprise operating the first heat source L1 during the heating step at block 112 at a power input different to a preceding power input of the preceding layer so as to heat the layer-specific region 50 to a temperature different to that of the layer-specific region 50 of the preceding layer. At block 114, the method comprises measuring the temperature of the layer-specific region 50 after the step of heating the layer-specific region 50 with the first heat source L1 at blocks 106 and 112, and determining a corrected power input for the first heat source L1 based on the temperatures measured for each layer. The outcome of the pre-calibration routine is a correction of the input power profile to the first heat source with respect to its heating modes at blocks 106 and 112. A subsequent calibration routine for calibrating the thermal sensor 72, and/or a subsequent build process 200, may thus comprise applying the correction to the power input of the first heat source L1 during the step of heating with the first heat source L1 at block 112.

Where both a first and second heat source L1, L2 are used in the apparatus for the heating steps at block 106 and 112, the layer cycle of the pre-calibration routine may further comprise operating the first heat source L1, during the heating step at block 112, and the second heat source L2, during the heating step at block 106 following distributing each layer, at respective power inputs different to those of a preceding layer so as to heat the layer-specific region 50 (and preferably so as to heat the entire build bed surface 12, for thermal uniformity); block 114 comprises measuring the temperature of the layer-specific region 50 after each step of heating with the first heat source L1 at block 112 and measuring the temperatures of the layer-specific region 50 after the step at block 106 of heating with the second heat source L2; and determining from the measured temperatures at block 114 a calibration to at least one of the power input profiles of the first and second heat source L1, L2 so as to operate the first and second heat sources as relative calibrated first and second heat sources; wherein the calibration to the at least one of the power input profiles is the outcome of the pre-calibration routine, and the outcome is applied to subsequent layer cycles. The subsequent calibration routine for calibrating the thermal sensor 72, and/or the subsequent build process 200, may thus comprise applying the outcome of the pre-calibration routine to at least one of the power inputs of the first and/or second heat source L1, L2.

In another example, a calibration routine for the third heat source (overhead heater 20) may be carried out, for example after a calibration routine for the thermal sensor 72, wherein the calibration routine for the third heat source is based on measurements using the calibrated thermal sensor 72, and wherein the calibrated third heat source is used during the layer cycle of any subsequent calibration routines and during the layer cycle of the build process.

Thermal Sensor and Thermal Feedback Control

The thermal sensor 72 may be a pyrometer, an array of pyrometers, an infrared line scan sensor array, or a thermal camera with a high-resolution two-dimensional pixel array able to monitor the entire build bed surface 12. The pixel array may, for example, be arranged such that different groups of pixels monitor corresponding different zones of the build bed surface 12. As described above, a respective one or more heater elements of the overhead heater 20 may be controlled to affect the temperature of a corresponding zone of the build bed surface 12 based on the temperature measurements of the groups of pixels of the thermal sensor 72 and the predefined target layer temperature T3 (target), thus achieving zonal temperature feedback control. During the layer cycle 300 of the build process 200 and/or the calibration process 100, the temperature of each layer may be measured more than once using the thermal sensor 72. For example, measurements may be made following each of the layer cycle steps. This allows assessment of the thermal state of the layer between the different steps of the layer cycle. Such measurements may be used as follows. When applied during either or both of the build process 200 and the calibration process 100, the third heat source 20 such as the overhead heater 20 may be operated in response to the measured temperature profiles measured by the thermal sensor 72 during the layer cycle 300. Preferably, the thermal measurements comprise a plurality of temperature measurements of some, and preferably of a majority, of the build bed surface 12. For example, step (iv) of the layer cycle of the build process 200, and optionally also of the calibration process 100, may comprise measuring a temperature of the surrounding area surrounding the layer specific region 50, and operating the second heat source L2 and/or the third heat source 20 over a subsequent layer cycle in response to the measured temperature of the surrounding area. In variants of the apparatus, furthermore, the third heat source 20 may comprise an array of individually operable heating elements positioned above the build bed surface 12, and the thermal sensor 72 may comprise an array of individual sensor pixels, wherein measuring the temperature at block 114/214 of the layer cycle may further comprise determining a zonal temperature for each of a plurality of zones of the build bed surface 12 as measured by a subset of the sensor pixels; and determining a zonal temperature difference between each zonal temperature and the target layer temperature T3 (target) for the build bed surface 12 that is lower than a melting temperature of the particulate material. The step of heating each layer by the third heat source 20 may furthermore comprise heating each zone by operating one or more corresponding heating elements in response to the determined zonal temperature difference and the target layer temperature T3 (target) to adjust the temperature of the build bed surface 12 towards a uniform target layer temperature T3 (target). The overhead heater 20 (the third heat source) is operated during both the calibration process 100, during each calibration routine, and the build process 200. Furthermore, the overhead heater 20 may be operated continuously during each layer cycle so as to assist in returning the temperature profile of the newly distributed layer to the target layer temperature and/or to maintain the temperature profile of the build bed surface 12 at or near the target layer temperature T3 (target), for example to within no more than +/–1° C. deviation. In variants, the third (further) heat source 20 and/or the first heat source L1 and/or the second heat source L2 may be operated based on a measured temperature of the layer following the step of heating at block 106 and 206 and/or after the step of heating at block 112 and 212, a temperature of the layer using the array of individual sensor pixels; wherein a zonal temperature is determined for each of a plurality of zones of the build bed surface as measured by a subset of the array of sensor pixels; and a zonal temperature difference is determined between each determined zonal temperature and the target layer temperature T3 (target). The step of heating each layer by the third (further) heat source 20 may thus comprise heating each zone, for example continuously throughout each step of the layer cycle 300, by operating one or more corresponding heating elements in response to the determined zonal temperature difference and further based on a target layer temperature (also in case of feedback control of the second heat source L2). The determined temperature may be the temperature, e.g. average temperature, of the surrounding area surrounding the layer-specific regions 50. For feedback control of the first heat source L1, a target fuse temperature may be provided, to be reached by the layer specific region 50 following heating with the first heat source.

Figure 9:
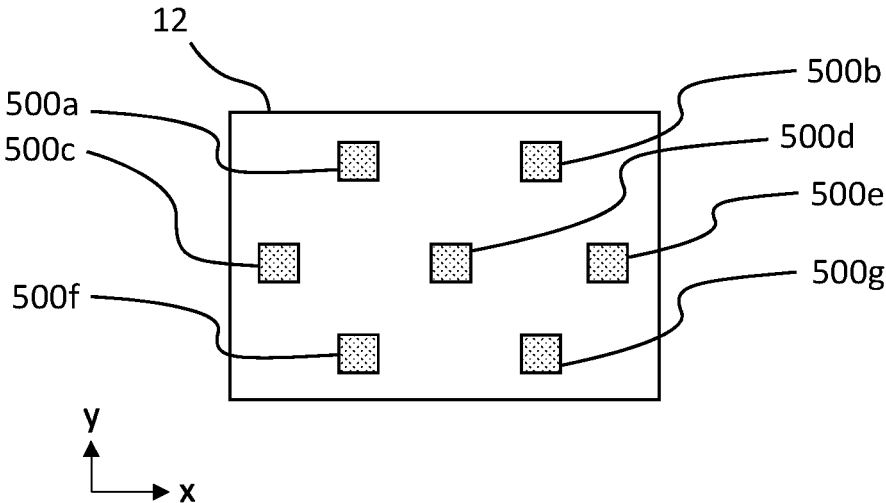
FIG. 9 is a schematic plan view of the build bed surface for a calibration routine.
Figure 10:
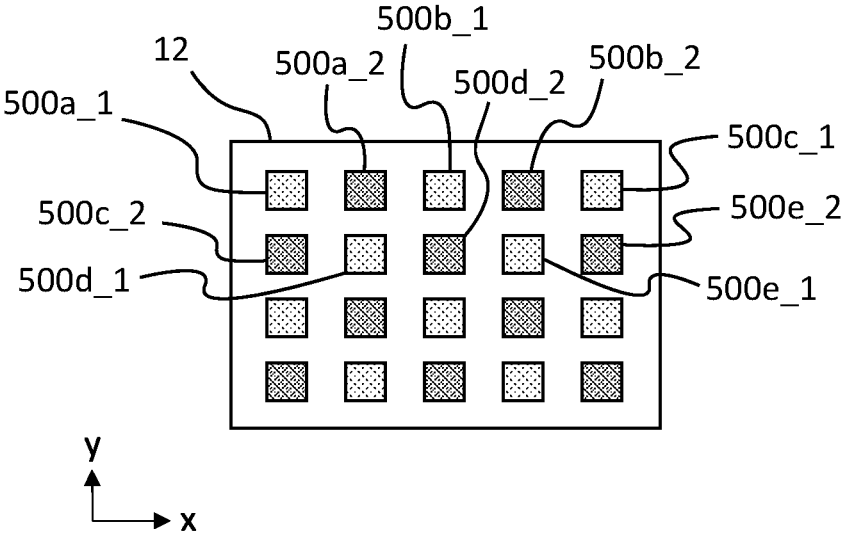
FIG. 10 is a variant of FIG. 9.

A further calibration routine may comprise aligning the thermal sensor with respect to the build bed surface 12, and/or to correct for thermal image distortions. An alignment calibration routine may comprise the layer cycle steps 300, wherein absorption modifier in the form of radiation absorber is deposited at block 110 over a plurality of areas 500_n comprised within the layer-specific region 50 of the build bed surface 12; and/or wherein absorption modifier in the form of absorption inhibitor is deposited over a surrounding area surrounding the plurality of areas 500_n. Such areas are illustrated in FIG. 9 (areas 500a-500g in this example illustration). Furthermore, the step (iv) of the layer cycle of the alignment calibration routine comprises measuring the temperature of the build bed surface 12 after the step (iii) of heating. This may comprise detecting the position of the areas 500_n and comparing them to an expected position based on the bitmap that is used to control the deposition of the absorption modifier. Furthermore, a calibration outcome in the form of an alignment correction of the thermal image with respect to the location of the build bed surface 12 and/or a distortion correction of the thermal image for each pixel of the thermal image is determined, based on the measured temperatures by the thermal sensor 72. The alignment correction and/or a distortion correction is applied to subsequent measurements by the thermal sensor at step (iv) for any subsequent layers, for example before starting calibration routines for the one or more heat sources and for the set point of the thermal sensor.

The calibration routine for the thermal sensor 72 may at step (b2) of block 110 comprise the first layer-specific region 50 to include a plurality of first areas 500_n arranged over the build bed surface 12, as shown in FIG. 9, and over which radiation absorber is deposited (or around which absorption inhibitor is deposited). The arrangement of the first areas 500_n may be different to the areas of the alignment routine of the thermal sensor. Where the thermal sensor comprises a plurality of sensor pixels, block 114 may comprise measuring the temperature within each first area 500 with a corresponding one or more pixels of the plurality of sensor pixels. At block 124, the calibration outcome in the form of a calibrated measurement scale for the thermal sensor may then be based on an average set point determined from each set point determined for each first area 500. Alternatively, the calibration outcome may be a per-pixel, or grouped, calibrated measurement scale, determined for each of the plurality of sensor pixels, or groups of sensor pixels, based on the measured temperature for each first area 500 of each layer of the calibration routine. Such a calibration outcome determines and applies local set points for groups or individual pixels, and may thus further reduce or remove thermal distortions in the thermal images of the sensor caused by pixel to pixel sensitivity for example.

In variants of the method, two calibration routines may be carried out within the same layer sequence. For example, the calibration routine 100_2 for the thermal sensor may be carried out over at least some of the same layers as the initial calibration routine 100_1 or the "final" calibration routine 100_3 of the heat source(s) L1, L2. The outcome of such a combined sequence will be at least one of the first and second calibrated input power profiles for the first and second heat source, and the set point for the measurement scale of the thermal sensor 72 after the combined layer cycle 300. For example, with reference to FIG. 10, at step (b2) for the calibration routine for the thermal sensor, a plurality of first areas of the first layer-specific region 500a_1, 500b_1, 500c_1 . . . may be defined by the absorption modifier. Within at least some of the same layers of the subset of layers, at respective and combined step (b2) for the calibration routine for the first heat source, or the first and second heat source, a plurality of second layer-specific regions 500a_2, 500b_2, 500c_2 . . . may be defined by the absorption modifier. These second layer-specific regions 500a_2, 500b_2, 500c_2 are shaded slightly darker compared to the first areas 500a_1, 500b_1, 500c_1 . . . of the first layer-specific region in FIG. 10. Using the capability to apply different amounts of for example radiation absorber over some of the regions, for example the plurality of first areas, a different type of calibration test may be designed with different heating effects compared to the plurality of second areas.

During a build process 200, the heat source L2 may be predominately used to return the temperature profile of the freshly distributed layer towards the target layer temperature T3 (target), and the third heat source 20 may be used to maintain the temperature profile of the freshly distributed layer and of the unprocessed regions of the build bed surface 12 (the surrounding areas surrounding the layer-specific region 50 that are not selectively heated by the first heat source L1) at or close to the target layer temperature throughout the duration of the layer cycle. The build process 200 may thus further comprise operating the second heat source L2 in response to the temperature profiles measured by the thermal sensor 72 so as to preheat each distributed layer to a target layer temperature, for example the same target layer temperature T3 (target) predefined for the operation of the third heat source 20, between the melting temperature and the solidification temperature of the particulate material.

In the case of the first heat source L1, the measured temperature profiles may be measured temperature profiles at least following the step at block 112 of heating with the first heat source L1 ("post-fuse temperature measurements"), and are compared against a pre-defined fusing temperature of the layer-specific region 50. Based on a determined deviation between a measured post-fuse temperature and a predefined fusing temperature, the build process may further comprise operating the first heat source L1 in response to the measured post-fuse temperature profiles to heat each further layer-specific region to the predefined fusing temperature. Deviations from the predefined fusing temperature may be due to local variations in thermal mass within the build bed, as a result of the shape of the object or the location of the object, for example.

The first heat source L1 and the second heat source L2 may comprise one or more individually controllable heat sources. For example, a further first heat source may be arranged on the one or more carriages 30_1, 30_2 to provide a further step of heating the layer-specific region during each layer cycle between the step of heating with the first heat source and the step of distributing the further layer using the distribution module. The further first heat source may for example be mounted on the same carriage as the first heat source, and follows the first heat source L1 during movement along the first direction. Alternatively, the further first heat source may be mounted ahead of and on the same carriage as the distribution module 32. Similarly, the further second heat source may be arranged on the one or more carriages to provide a further step of heating the freshly distributed layer during each layer cycle between the step of heating with the second heat source and the step of depositing absorption modifier. The further second heat source may for example be mounted on the same carriage as the second heat source, and follows the second heat source L2 during movement along the first direction. Alternatively, the further second heat source may be mounted ahead of and on the same carriage as the deposition module 38. Regardless of its location, the calibration process may comprise a calibration routine to calibrate any of the further heat sources.

Absorption Modifier Variants and Use of Varying Levels of Absorption Modifier.

In the examples described herein, the radiation of the various heating devices (heat source L1, preheat source L2, overhead heater 20) may preferably be infrared radiation, and the absorption modifier in general terms causes the layer-specific region to heat more than the surrounding area during the step of heating with the heat source L1. The absorption modifier may be radiation absorber such as carbon black, or absorption inhibitor, such as water acting as a coolant, or a reflector of the radiation of the heat source. However, other wavelength spectra may be suitable in combination with respective absorption modifiers and particulate materials. For infrared radiation absorber, the layer cycle comprises depositing the radiation absorber over the layer-specific region 50. For absorption inhibitor, the layer cycle comprises depositing the absorption inhibitor at least over the surrounding area surrounding the layer-specific region 50. The entire layer may be provided with inhibitor such that the surrounding area is provided with an amount that prevents melting of the particulate material, and such that the layer-specific region 50 is provided with a comparatively lower amount of inhibitor, or no inhibitor. In this way, the layer-specific region 50 is capable of absorbing more heat from the first heat source L1 than the surrounding area, thus achieving selectivity. In some examples, both types of absorption modifier may be provided to achieve the desired selectivity.

For some calibration routines requiring progressive heating of the layer-specific region 50, such as the calibration routine for the thermal sensor when heating with the second heat source L2 at block 112, it was found that improved calibration outcomes with respect to a subsequent build process 200 may be obtained when the speed profile along the first direction of the first and/or second heat source is substantially the same during each layer cycle. Furthermore, it may be preferable that the period of time of heating by the first and optionally the second heat source is substantially constant and the same for each layer of the layer cycle. Progressive heating effects may be achieved by altering the absorptive properties of the layer-specific region 50, for example by changing the amount of absorption modifier applied to the layer-specific regions 50 of successive layers of build material. This reduces the number of, or avoids any, changes to the input power profile in successive layers. For example, the coverage of the absorption modifier per unit area over the layer-specific region 50 may be altered to achieve progressive heating. For each subsequent layer during the layer cycle of a calibration routine, the method may comprise depositing a further amount per unit area of absorption modifier over the layer-specific region 50, wherein each further amount per unit area of absorption modifier is different to the preceding amount per unit area of absorption modifier. In the case of radiation absorber, the amount of radiation absorber deposited per unit area over the layer-specific-region 50 for each further layer may thus be higher than that deposited over the layer-specific region 50 of the preceding layer. Varying the amount of absorption modifier for each subsequent layer may conveniently be achieved by providing the absorption modifier comprised within a fluid, and depositing the amount of absorption modifier using a droplet deposition module. The coverage may be defined by one or both of the print pattern, determining the spacing between drops deposited (as controlled by the printed image pattern and/or by a dither scheme), and the volume of each drop deposited at each location on the layer-specific region 50. For each further layer therefore, one or more of the following may be applied at block 110:

depositing a different number of fluid drops (for radiation absorber, a higher number; for inhibitor, a lower number) per unit area over the layer-specific region 50 compared to the number of drops deposited per unit area over the layer-specific region 50 of the preceding layer, preferable for a substantially constant volume per drop; and depositing fluid drops of different volumes (for radiation absorber, a larger volume; for inhibitor, a smaller volume) per unit area over the layer-specific region 50 compared to the volume of each drop deposited per unit area for the preceding layer.

For example, a radiation absorbing fluid of certain absorber pigment loading, for example of carbon black, may be provided. By depositing increasing absorber amounts per unit area of the layer-specific region 50 for each subsequent layer, the temperature of the layer-specific region 50 after heating by the first heat source L1 increases layer by layer. The absorption modifier may be deposited during one pass of the droplet deposition module or more over the build bed surface 12.

Additionally, or instead, the type of absorption modifier may be altered to achieve progressive heating. Multiple absorption modifiers (e.g. radiation absorbers) may be provided to the apparatus such that for each further layer, a different absorption modifier is deposited over the layer-specific region 50, wherein each different absorption modifier is capable of causing the particulate material of the layer-specific region 50 to absorb a different amount of energy of radiation from the heat source compared to the absorption modifier deposited over the layer-specific region of the preceding layer. Each absorption modifier may comprise a different colour of absorption modifier capable of absorbing a different, larger, amount of energy of the radiation spectrum provided by the heat source compared to that of the preceding amount of absorption modifier (radiation absorber or inhibitor). Multiple fluids provided to the apparatus may be deposited in an overlapping multi-fluid pattern to vary the absorption of the energy of the radiation of the heat source. The radiation absorber (or absorption modifier) may be deposited in the form of a multi-fluid pattern, wherein the multi-fluid pattern deposited over the layer-specific region 50 of each further layer is different to that deposited over the layer-specific region 50 of the preceding layer, and such that the layer-specific region 50 is capable of absorbing a higher amount of energy of radiation provided by the heat source compared to the layer-specific region 50 of the preceding layer.

For the calibration routine of the first and/or second heat source, a plurality of subregions may be measured by the thermal sensor after each heating step. At least two different absorption modifier amounts may be deposited over two respective ones of the plurality of regions so that two temperatures are measured after each step of heating. For example, the layer specific region 50 may comprise a first and a second layer-specific subregion, and the calibration routine may further comprise at block 106, heating a first layer-specific subregion with the second heat source L2; block 114 comprises measuring a first temperature of the first layer-specific subregion using the thermal sensor 72; block 110 comprises: depositing a first amount of absorption modifier in the form of radiation absorber over the first layer-specific subregion and a second amount of absorption modifier in the form of radiation absorber over a second layer-specific subregion; or, depositing a first amount of absorption modifier in the form of absorption inhibitor over a surrounding area surrounding the first layer-specific subregion and the second layer-specific subregion region, and depositing a second amount of absorption modifier in the form of absorption inhibitor over the second layer-specific subregion. The first and second amounts are chosen so that the step of heating the first and second layer-specific subregions with the first heat source L1 at block 112 causes the following: where the absorption modifier is radiation absorber, the first amount causes the first layer-specific subregion to heat to a higher temperature than the second layer-specific subregion; or where the absorption modifier is absorption inhibitor, the second amount causes the second layer-specific subregion to heat to a higher temperature than the surrounding area and to a lower temperature than the first layer-specific subregion. At block 114, measurements by the thermal sensor further comprise measuring a second temperature of the first layer-specific subregion and a third temperature of the second layer-specific subregion, and determining from the measured first, second and third temperatures for each pair of input power profiles a corrected input power profile for at least one of the first and second heat source. The amount of absorption modifier may be varied by any of the above described approaches. The step of heating with the third heat source 20 based on the temperature measurements at block 114 and in combination with the first, or first and second, heat source supports a consistent and stable thermal process. For example, the third heat source may emit radiation that is readily absorbed by the particulate material in absence of radiation absorber, and may therefore assist in maintaining the newly distributed layer at the target layer temperature T3 (target). The second heat source at block 106 and 206 of the respective calibration and build process (see FIG. 8, for example) may assist in returning the freshly distributed layer towards, or to, the target layer temperature T3 (target) to avoid warp in the previously fused/melted layer-specific region. In variants of the method disclosed herein, each layer cycle may comprise a set of sublayers, wherein each sublayer is processed according to the same steps of distributing (and optionally of preheating), depositing absorption modifier and heating of that layer. For each layer, the measured temperatures may be an average temperature determined from the measurements of one or more of the sublayers of that layer. Over, for example, the first few sublayers of a calibration routine layer cycle, thermal stability may be achieved, and for the remaining sublayers, a respective average temperature value is determined for that layer. Furthermore, in variants, the layer-specific region may comprise a plurality of subregions distributed over the build bed surface 12. It should be noted that it is not necessary to immediately proceed from one layer of the layer cycle described herein to the next layer of either the calibration process 100 or the build process 200. Instead, between adjacent layers, additional layers having a different layer cycle may be carried out, for example, a number of unprocessed, blank layers distributed without the steps of depositing absorption modifier and heating with the first heat source L1. Thus, one or more intermediate layer cycles may be applied that are different to the layer cycle of the disclosed calibration method without substantially affecting the desired outcome of the method disclosed herein. Furthermore, due to the cyclical nature of the processes described, the steps of heating preferably comprise heating the build bed surface 12 comprising the layer-specific region 50. This means that the thermal processes are applied across the entirety of the build bed surface 12. The method according to the invention and its variants are found to provide improved reliability in object quality by at least some of the layer cycle conditions of the calibration process being substantially, or at least predominantly, the same as those of the build process layer cycle. Known calibration processes may apply a very different layer cycle to that of a build process, such as uni-directional heating in a calibration routine and bi-directional heating in a subsequent build process.

The method of operation and its variants as described may be carried out by a controller 70 of the apparatus 1 and configured to carry out any of the method or variants in part or fully. Corrections of the thermal sensor 72 based on the determined set point may be applied to the temperature measurements of each group of pixels or to each pixel of the thermal sensor 72. The set point may be determined again at any time to adjust for changes in material properties due to recycling rate and/or ageing of at least some of the components of the particulate material.

The invention claimed is:

1. A method of operation for an apparatus for a layer-by-layer manufacture of a 3D object from particulate material, the apparatus comprising a preheat source, a fusing heat source, and a stationary overhead heat source arranged above a build bed surface, and a thermal sensor; the method comprising:

carrying out a thermal calibration process comprising a thermal calibration routine for a thermal control component of the layer, wherein the thermal control component comprises the thermal sensor and the thermal calibration routine is for the measurement scale of the thermal sensor, and subsequently carrying out a build process to manufacture a 3D object;

wherein the thermal calibration routine includes a calibration layer cycle having the steps of:

(i) distributing a layer of particulate material over a build area, the layer providing the build bed surface of the build area;

(ia) after the distributing step, heating the build bed surface by the preheat source;

(ii) after the step of heating by the preheat source, depositing a radiation absorber over a layer-specific region within the build bed surface; and (iii) after the depositing step, heating the layer-specific region by passing, while operating, the fusing heat source across the build bed surface;

wherein the calibration layer cycle also includes measuring a temperature of the build bed surface using the thermal sensor at least once after one or more of steps (i) to (iii);

wherein the calibration layer cycle also includes heating the build bed surface of each layer by continuously operating the stationary overhead heat source operated in response to the one or more measured temperatures with respect to a target layer temperature between the solidification temperature and the melting temperature of the particulate material;

wherein the calibration layer cycle is repeated a number of times until the thermal calibration routine complete;

wherein an outcome of the completed thermal calibration routine is based on the measured temperature in step (iv) of the build bed surface and is applied to the measurement scale of the thermal sensor for the subsequent build process;

wherein the build process is performed after the calibration process and includes a build layer cycle having the steps of:

(i-2) distributing a layer of particulate material over a build area, the layer providing the build bed surface of the build area;

(ia-2) after the distributing step (i-2), heating the build bed surface by the preheat source to preheat the layer to a preheat temperature between the solidification temperature and the melting temperature of the particulate material;

(ii-2) after the step (ia-2) of heating by the preheat source, depositing radiation absorber over at least one of a layer-specific region within the build bed surface; and (iii-2) after the depositing step (ii-2), heating the layer-specific region by passing, while operating, the fusing heat source across the build bed surface and causing the particulate material within the layer-specific region to melt;

wherein the build layer cycle also includes measuring a temperature of the build bed surface using the thermal sensor at least once after one or more of steps (i-2) to (iii-2);

wherein the build layer cycle also includes heating the build bed surface of each layer by continuously operating the stationary overhead heat source operated in response to the one or more measured temperatures with respect to the target layer temperature between the solidification temperature and the melting temperature of the particulate material;

wherein the build layer cycle is repeated a number of times until the build process is complete.

2. The method of claim 1, wherein the calibration layer cycle steps (i) and (i-2) of distributing each layer and (iii) and (iii-2) of passing the fusing heat source over each layer are carried out in a first direction.

3. The method of claim 2, wherein the measuring of the build layer cycle includes measuring a temperature of the surrounding area surrounding the layer specific region, and operating the stationary overhead heat source and/or the preheat source over a subsequent layer cycle in response to the measured temperature of the surrounding area.

4. The method of claim 2, wherein the thermal control component further comprises one or both of the fusing heat source and the preheat source, and wherein the calibration process comprises at least one further calibration routine selected from:

an alignment correction routine for the measurement position of the thermal sensor, wherein the thermal sensor comprises an array of a plurality of individually controllable pixels;

a distortion correction routine for the measurement position and/or scale of the thermal sensor, wherein the thermal sensor comprises an array of a plurality of individually controllable pixels; and a calibration routine for the input power profiles of the fusing heat source and the preheat source with respect to one another and/or with respect to the measurement scale of the thermal sensor;

wherein the layer cycle of the further calibration routine is the same as the calibration layer cycle.

5. The method of claim 2, wherein the steps (i), (ia), (iii), (i-2), (ia-2) and (iii-2) are all carried out in the same direction and at the same speed profile.

6. The method of claim 2, wherein for each layer of the thermal calibration routine, the calibration layer cycle further comprises:

initiating the step (iii) of heating the build bed surface with the fusing heat source after a predefined first time interval after initiating the step (i) of distributing the layer;

initiating the step (i) of distributing each layer after a predefined second time interval after the step (iii) of heating the previous build bed surface with the fusing heat source; and initiating the step (ia) of heating the build bed surface with the preheat source after a predefined third time interval after initiating the step (i) of distributing the layer;

wherein for each layer of the build process, the build layer cycle further comprises:

initiating the step (iii-2) of heating the build bed surface with the fusing heat source after the predefined first time interval after initiating the step (i-2) of distributing the layer;

initiating the step (i-2) of distributing each layer after the predefined second time interval after the step (iii-2) of heating the previous build bed surface with the fusing heat source; and initiating the step (ia-2) of heating the build bed surface with the preheat source after the predefined third time interval after initiating the step (i-2) of distributing the layer;

wherein the predefined first, second and third time intervals are constant and the duration of the build layer cycle is the same for each layer of the build process.

7. The method of claim 6, wherein the predefined first, second and third time intervals are constant and the period of time of the calibration layer cycle is the same for each layer of the thermal calibration routine.

8. The method of claim 1, wherein the steps (ia) and (ia-2) of heating are carried out by passing the preheat source over each layer while operating the preheat source to heat the layer; and wherein the steps (i) and (i-2) of distributing each layer, (ia) and (ia-2) of passing the preheat source over the build bed surface, and (iii) and (iii-2) of passing the fusing heat source over each layer are carried out in a first direction.

9. The method of claim 1, wherein the measuring of the build layer cycle includes measuring a post-fuse temperature of the layer-specific region after the step (iii-2) of heating with the fusing heat source; and heating a subsequent layer-specific region by operating the fusing heat source at a subsequent step (iii-2) in response to the measured post-fuse temperature.

10. The method of claim 1, wherein the stationary overhead heat source comprises an array of individually operable heating elements positioned above the build bed surface, and wherein the thermal sensor comprises an array of individual sensor pixels, wherein the measuring of the calibration layer cycles and of the build layer cycles includes:

determining a zonal temperature for each of a plurality of zones of the build bed surface as measured by a subset of the sensor pixels; and determining a zonal temperature difference between each zonal temperature and the target layer temperature;

wherein the steps of heating the build bed surface by the stationary overhead heat source includes heating each zone by operating one or more corresponding heating elements in response to the determined zonal temperature difference.

11. The method of claim 1, wherein the stationary overhead heat source comprises an array of individually operable heating elements positioned above the build bed surface, and wherein the thermal sensor comprises an array of individual sensor pixels, wherein the measuring of the calibration layer cycles and the build layer cycles includes:

measuring a temperature of the surrounding area using the array of individual sensor pixels;

determining a zonal temperature for each of a plurality of zones of the build bed surface as measured by a subset of the array of sensor pixels; and determining a zonal temperature difference between each zonal temperature and the target layer temperature;

wherein the steps of heating the build bed surface by the stationary overhead heat source includes heating each zone continuously throughout each step of the layer cycle by operating one or more corresponding heating elements in response to the determined zonal temperature difference.

12. The method of claim 1, wherein the thermal control component further comprises the stationary overhead heat source; and wherein the calibration process comprises at least one further calibration routine selected from:

an alignment correction routine for the measurement position of the thermal sensor, wherein the thermal sensor comprises an array of a plurality of individually controllable pixels to be aligned with the build bed surface;

a distortion correction routine for the measurement position and/or scale of the thermal sensor, wherein the thermal sensor comprises an array of a plurality of individually controllable pixels to be aligned with the build bed surface; and a calibration routine for the input power profile of the stationary overhead heat source;

wherein the layer cycle of the further calibration routine is the same as the calibration layer cycle.

13. The method of claim 1, wherein step (iii), when carried out during at least one of the calibration layer cycles of the thermal calibration routine for the thermal sensor, comprises: operating the fusing heat source at a fusing power input so as to cause the particulate material of the layer-specific region to melt; and wherein the one or more measured temperatures of step (iv) of the calibration layer cycles are used to determine a set point for the temperature scale of the thermal sensor based on a thermal characteristic of the particulate material, and to calibrate the measurement scale of the thermal sensor to the set point, and wherein the measurements by the thermal sensor in step (iv-2) of the build layer cycle are calibrated temperature measurements.

14. The method of claim 13, wherein the calibration process comprises a pre-calibration routine for the fusing heat source carried out before the calibration routine for the thermal sensor, wherein the layer cycle of the pre-calibration routine is the same as the calibration layer cycle, and wherein successive layer cycles of the pre-calibration routine comprise:

operating the fusing heat source during step (iii) at a power input different to a preceding power input of a preceding layer so as to heat the layer-specific region to a temperature different to that of the layer-specific region of the preceding layer;

wherein the measuring includes measuring the temperature of the layer-specific region following the step of heating with the fusing heat source at step (iii);

wherein the outcome of the pre-calibration routine is a corrected power input for the fusing heat source based on the measured temperatures of the layer-specific region of each layer; and wherein the calibration routine for the thermal sensor comprises, during step (iii) of heating with the fusing heat source, applying the corrected the power input of the fusing heat source.

15. The method of claim 1, wherein the thermal control component further comprises the preheat source and the fusing heat source, and wherein the calibration process comprises a calibration routine for the preheat source and the fusing heat source applied before and/or after the calibration routine for the thermal sensor; wherein the outcome of the calibration routine for the preheat source and the fusing heat source is a corrected first and/or second input power profile, and wherein the layer cycle of the calibration routine for the preheat source and the fusing heat source is the same as the calibration layer cycle and also comprises:

operating the fusing heat source at a first input power profile during the step (iii);

operating the preheat source at a second input power profile during step (ia);

wherein, for each layer of the calibration routine for the preheat source and the fusing heat source, each pair of first and second input power profiles is different to a preceding pair of a preceding layer by at least one of the first and second input power profiles;

wherein the measuring of the calibration routine for the preheat source and the fusing source further includes measuring a first set of temperatures of each layer-specific region after step (iii) of heating with the fusing heat source and measuring a second set of temperatures of each layer-specific region after the step of heating with the preheat source; and receiving a first target temperature for the layer-specific region after heating with the fusing heat source and a second target temperature of the layer-specific region after heating with the preheat source;

determining, from the measured first and second set of temperatures, and based on the first target temperature and the second target temperature, a corrected first input power profile along the first direction for the fusing heat source and/or a corrected second input power profile along the first direction for the preheat source; and wherein, when the calibration routine for the preheat source and the fusing heat source is applied before that of the thermal sensor, the calibration layer cycle of the thermal calibration routine comprises applying the corrected first input power profile to the fusing heat source during the step (iii) and/or applying the corrected second power input profile to the preheat source during the step of heating the build bed surface; and when the calibration routine for the preheat source and the fusing heat source is applied after that of the thermal sensor, the build layer cycle of the build process comprises applying the corrected first input power profile to the fusing heat source during the step (iii-2) and/or applying the corrected second power input profile to the preheat source during the step (ia-2) of heating the build bed surface.

16. The method of claim 1, wherein the layer-specific region for the thermal calibration routine comprises a plurality of layer-specific regions.

17. The method of claim 1, wherein respective time periods between the initiation of each step and the initiation of the previous step in the calibration layer cycle and the build layer cycle are constant for each corresponding step in each successive layer cycle.

18. The method of claim 1, wherein for each layer, the calibration layer cycle and the build layer cycle further comprises:

initiating the steps (iii) and (iii-2) of heating the build bed surface with the fusing heat source after a predefined first time interval after initiating the steps (i) and (i-2) of distributing the layer; and initiating the steps (i) and (i-2) of distributing each layer after a predefined second time interval after the steps (iii) and (iii-2) of heating the previous build bed surface with the fusing heat source; and wherein a duration of the calibration layer cycle and of the build layer cycle is the same for each layer.

\* \* \* \* \*